(12) United States Patent
Kilabarda et al.

(10) Patent No.: US 7,165,309 B2
(45) Date of Patent: Jan. 23, 2007

(54) METHOD FOR ASSEMBLY OF A MOTORCYCLE FRAME

(75) Inventors: Velibor Kilabarda, Birmingham, MI (US); Michael R. Dugas, Brighton, MI (US); Peter C. Kekic, New Haven, MI (US)

(73) Assignee: Progressive Tool & Industries Co., Southfield, MI (US)

( * ) Notice: Subject to any disclaimer, the term of this patent is extended or adjusted under 35 U.S.C. 154(b) by 0 days.

(21) Appl. No.: 11/037,745

(22) Filed: Jan. 18, 2005

(65) Prior Publication Data

US 2005/0120536 A1 Jun. 9, 2005

Related U.S. Application Data

(62) Division of application No. 10/195,943, filed on Jul. 15, 2002, now Pat. No. 6,912,774.

(60) Provisional application No. 60/379,539, filed on May 9, 2002.

(51) Int. Cl.
*B23Q 3/00* (2006.01)
*B23P 21/00* (2006.01)

(52) U.S. Cl. .............................. 29/464; 29/430; 29/559

(58) Field of Classification Search .................. 29/559, 29/897.2, 464, 430, 783, 784, 791, 822, 824; 269/32; 198/687.1; 206/386
See application file for complete search history.

(56) References Cited

U.S. PATENT DOCUMENTS

| | | | |
|---|---|---|---|
| 2,931,644 A * | 4/1960 | Kenworthy | .................. 269/17 |
| 4,493,450 A | 1/1985 | Yuzui | |
| 4,572,017 A | 2/1986 | Rossi | |
| 4,733,768 A * | 3/1988 | Aquino et al. | ........... 198/369.2 |
| 4,811,891 A | 3/1989 | Yamaoka et al. | |
| 5,400,943 A * | 3/1995 | Rossi | .......................... 228/6.1 |
| 5,501,736 A | 3/1996 | Statz et al. | |
| 5,618,228 A | 4/1997 | Anderson | |
| 5,649,618 A | 7/1997 | Tetzloff | |
| 5,848,747 A | 12/1998 | Nishi | |
| 5,855,060 A | 1/1999 | Hollebrands et al. | |
| 5,870,809 A | 2/1999 | Nishi | |
| 5,940,961 A | 8/1999 | Parete | |
| 5,975,624 A | 11/1999 | Rasidescu et al. | |
| 6,112,858 A * | 9/2000 | Arnst | .......................... 187/269 |

(Continued)

FOREIGN PATENT DOCUMENTS

JP 57211431 12/1982

*Primary Examiner*—Essama Omgba
(74) *Attorney, Agent, or Firm*—Young Basile

(57) ABSTRACT

A method and apparatus for assembling motorcycle frames includes a conveyor defining a path of travel and a pallet movable along the conveyor through a workstation. The pallet supports a rotatable frame for receiving individual components and/or sub-assemblies in fixed relationship with respect to one another in a geometry fixture. The angular position of the rotatable frame and supported geometry fixture can be reoriented about an axis of rotation by engagement with a drive motor. The rotatable frame is normally locked in an angular orientation with respect to the pallet until released by engagement with a lock release actuator or key. The pallet is supported on a movable section of the conveyor, which can be guided between raised and lowered positions with respect to the workstation to accurately and repeatably position the support pallet with respect to the workstation for automated processing operations at the workstation.

20 Claims, 19 Drawing Sheets

U.S. PATENT DOCUMENTS

| | | |
|---|---|---|
| 6,293,454 B1 | 9/2001 | Zhang et al. |
| 6,390,284 B1 | 5/2002 | Yamada et al. |
| 6,408,504 B1 | 6/2002 | Yamaoka et al. |
| 2001/0015172 A1 | 8/2001 | Masaki et al. |
| 2001/0019004 A1 | 9/2001 | Sagane et al. |

* cited by examiner

METHOD FOR ASSEMBLY OF A MOTORCYCLE FRAME

RELATED APPLICATIONS

The present application is a Divisional application of patent application Ser. No. 10/195,943 filed on Jul. 15, 2002, now U.S. Pat. No. 6,912,774 which claims the benefit of provisional application Ser. No. 60/379,539 filed on May 9, 2002.

FIELD OF THE INVENTION

The present invention relates to a method and apparatus for the flexible assembly of a plurality of motorcycle frames on a single assembly line.

BACKGROUND OF THE INVENTION

The current assembly of motorcycle frames typically includes a primary work cell where several individual frame components are brought together and welded to one another. The current approach requires highly specialized work cells, each work cell dedicated to a particular frame configuration. Flexibility of the manufacturing process is limited.

SUMMARY OF THE INVENTION

A method and apparatus according to the present invention conveys workpieces along a path of travel. The path of travel can be an assembly line for the assembly of motorcycle frames. A plurality of pallets are movable along the path of travel defined by the convey system of the assembly line. Each pallet supports at least one workpiece-supporting frame or ring. A plurality of differently configured workpieces can be supported for movement along the path of travel. The workpieces can form a motorcycle frame constructed from individual components positioned with respect to one another in the frame or ring. Each frame or ring has at least one geometry-locating fixture for supporting and locating individual components in predetermined positions with respect to one another. Each geometry-locating fixture is removably associated with the corresponding frame or ring to accommodate the plurality of differently configured workpieces. Each geometry-locating fixture can include one or more elements selected from clamps, pins, guides or any combination thereof. Each frame or ring can be individually rotated through a predetermined angular arc at one or more workstations positioned along the path of travel to reorient the angular position of the workpiece being constructed to a desired angular position with respect to the rotational axis during processing operations. By way of example and not limitation, a frame or ring can be rotated to reorient a workpiece in an inverted orientation, so that a welding robot can perform a welding operation from above for easier access.

Each frame or ring can be conveyed along the path of travel by pallets carried along a conveyor located at, above, or below, the manufacturing floor depending on the particular application and plant layout. Each pallet can rotatably support one or more frames or rings. Each pallet can include a lock to prevent movement of the associated frame or ring during movement of the pallet along the path of travel. The individual pallets can be moved along the conveyor defining the path of travel. The conveyor can extend along the path of travel between and through one or more workstations.

The reorientation of the angular position of the frame or ring and the associated workpiece being constructed can be performed by bringing the pallet and an associated lock into operable engagement with a lock release and a motor or drive for rotating the frame or ring about an axis of rotation. By way of example and not limitation, the conveyor can be divided into individual sections, where some conveyor sections can be vertically moveable with respect to the path of travel for raising and lowering a pallet and associated workpiece carried thereon with respect to the workstation. For purposes of illustration, when a particular conveyor section is moved vertically, either raised or lowered relative to the workstation, the associated frames or rings can engage one or more motors for rotating the associated frames or rings with respect to the pallet. Rotation of each frame or ring results in reorientation of the associated workpiece being constructed into a desired position of angular orientation with respect to the axis of rotation. When properly oriented for the next processing operation, the pallet can be returned by lowering or raising the particular conveyor section, to the original position for delivery to the next workstation. Alternatively, the motor and lock release can be moved relative to the conveyor and/or pallet between an engaged position for reorienting the workpiece and a disengaged position allowing delivery and removal of the pallets along the conveyor.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
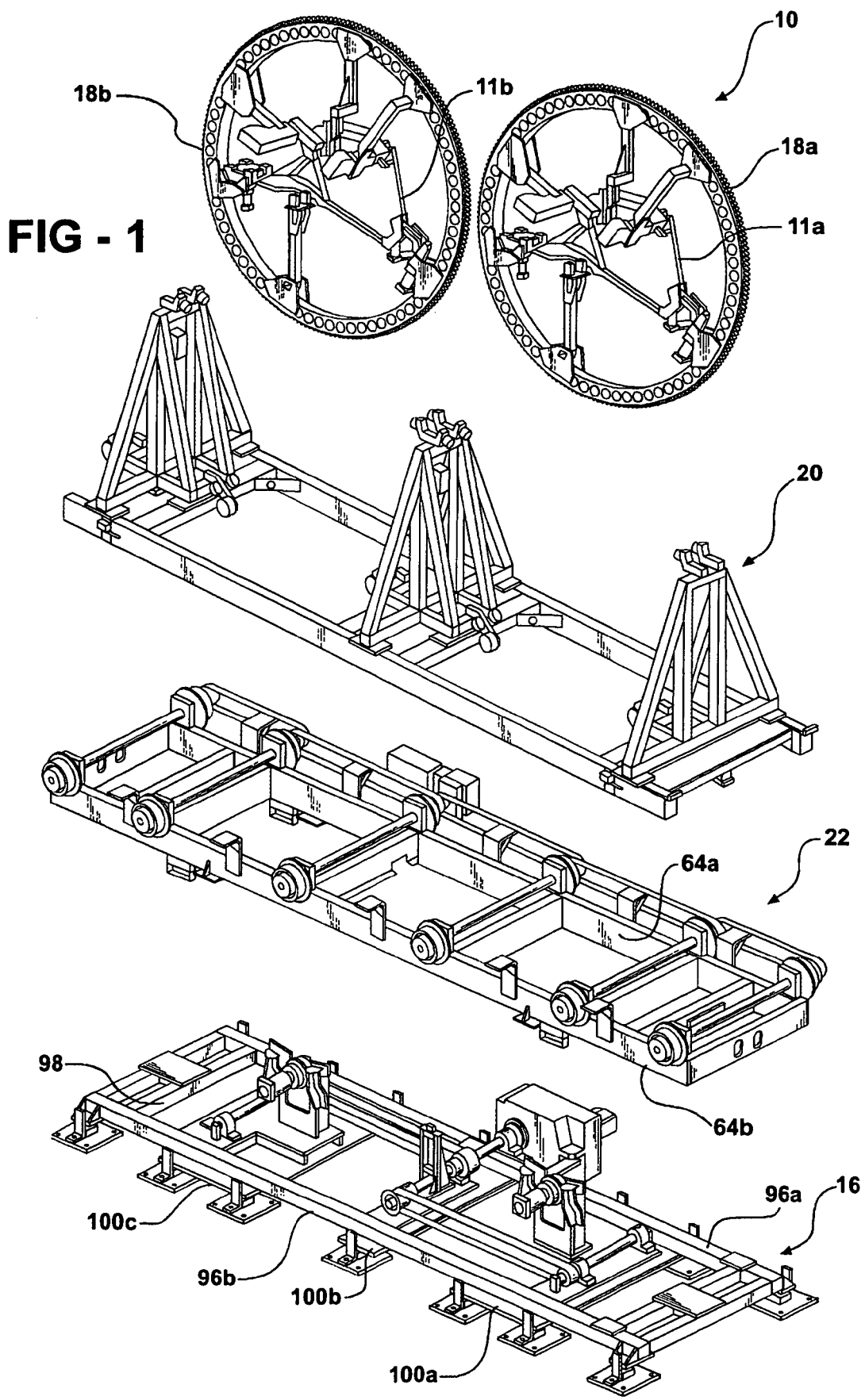
FIG. 1 is an exploded perspective view of a conveyor including a pallet movable along the conveyor for supporting associated frames or rings to receive a workpiece to be constructed, and reorienting means for rotating the associated frames or rings with respect to the supporting pallet according to the present invention.
Figure 2:
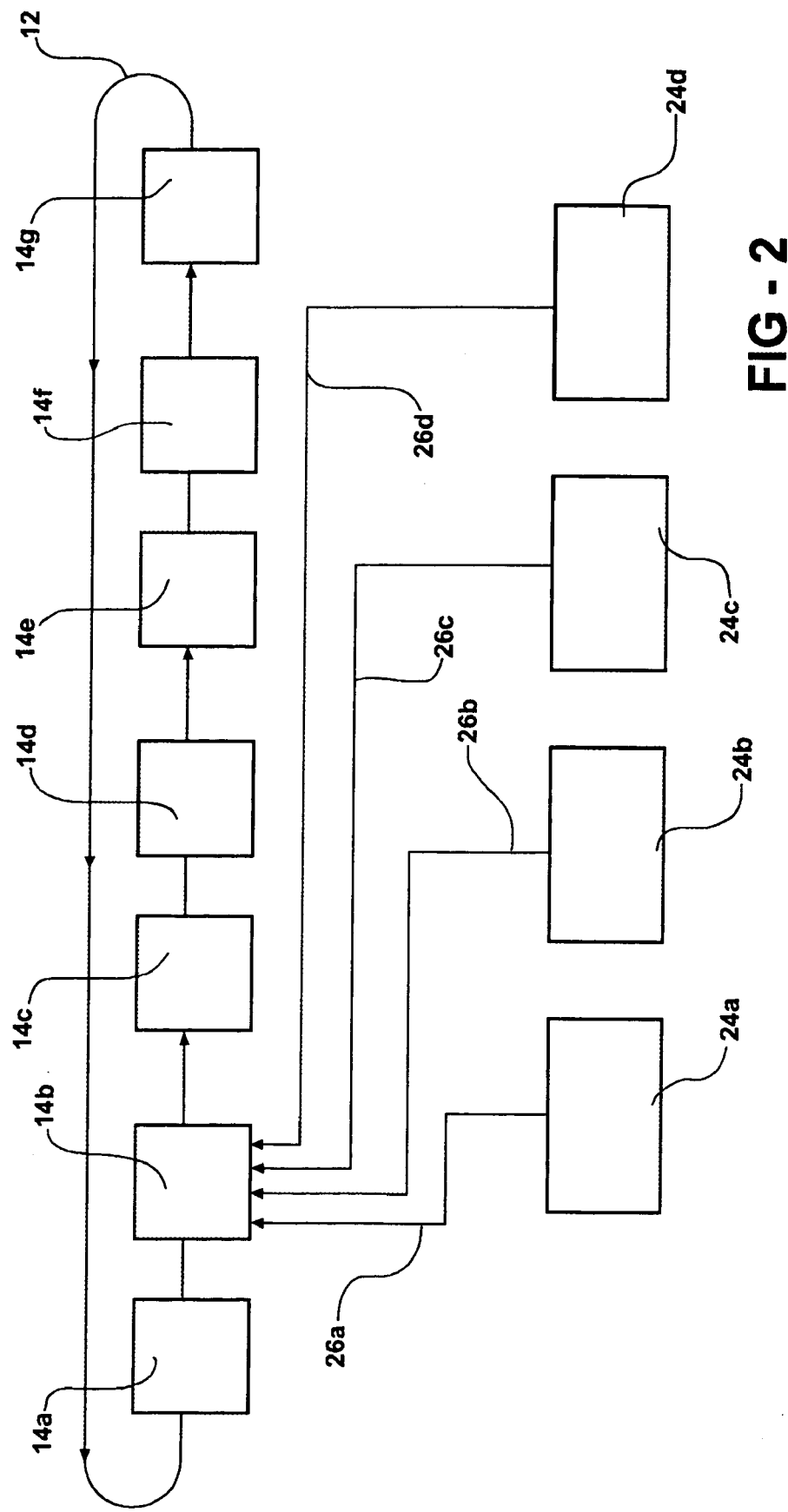
FIG. 2 is a schematic view of an assembly line according to the present invention.

Referring now to FIGS. 1 and 2, the present invention includes conveyance means 10 for transporting one or more workpieces along a path of travel 12 between and through one or more workstations 14a–14g positioned along the path of travel 12. Workpiece conveyance means 10 can include a pallet 20 movable along a conveyor 22 defining the path of travel 12. Each pallet 20 rotatably supports at least one frame or ring 18a, 18b. The conveyor 22 can include a plurality of sections operably associated with the pallet 20. A conveyor section can be located at each of the workstations 14a–14g. Positioning means 16 can be located relative to workstations for accurately positioning each pallet with respect to the workstation prior to performing any work on the workpieces. Positioning means 16 can operably engage the pallet 20 and/or the conveyor section 22 to accurately locate the pallet with respect to the workstation. At least one locating pin is operably associated with the positioning means 16 and can engage with the pallet 20, as either the pallet or locating pin is moved between a first position disengaged with respect to one another and a second position engaged with respect to one another.

The conveyor 22 moves workpieces between workstations 14a–14g, where one or more processing operations are performed on the workpieces. By way of example and not limitation, the present invention can define a motorcycle frame assembly line where workpieces, such as a plurality of individual components and/or sub-assemblies of a motorcycle frame are assembled with respect to one another at the workstations 14a–14g along the path of travel 12. Referring now to FIG. 2, sub-assembly stations 24a–24d can be positioned in a feeding relationship with respect to the path of the travel 12. Each sub-assembly station 24a–24d can be a single cell workstation, or a multiple cell workstation for assembling one or more sub-assemblies of the motorcycle frame. By way of example and not limitation, sub-assembly station 24a can assemble a horizontal tube subassembly; sub-assembly station 24b can assemble a vertical tube subassembly; sub-assembly station 24c can assemble a backbone/C-pan subassembly; and sub-assembly station 24d can assemble a fender rear forging subassembly. The assembled sub-assemblies can be placed on associated feeder lines, such as feeder lines 26a–26d, and moved to a loading station 14b positioned on the path of travel 12.

The sub-assemblies are received at the loading station 14b and are loaded into a geometry fixture carried by the rotatable frame 18a, 18b supported on the pallet 20 for movement along the conveyor 22. Additional components, such as, a steering head assembly casting, a right-hand and a left-hand front engine mount casting, a rear motor mount casting, and a tie link piece, or part, can be installed into the geometry fixture at the loading station 14b. The geometry fixture carried by the rotatable frames 18a, 18b can receive the workpieces 11a, 11b, such as sub-assemblies and other components, in fixed predetermined geometric positions with respect to one another for final assembly into a single unitary motorcycle frame assembly.

Figure 3:
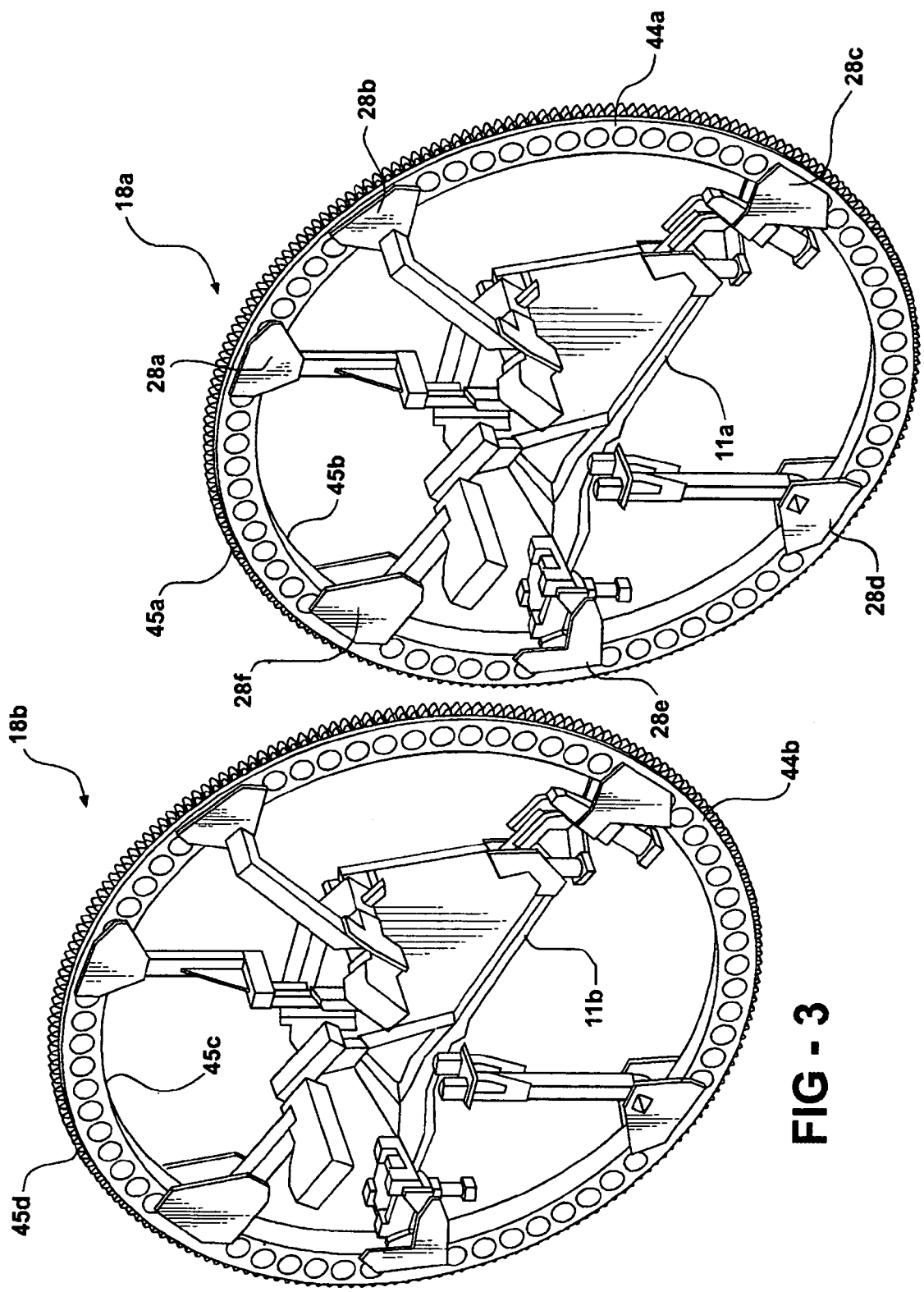
FIG. 3 is a perspective view of two frames or rings according to the present invention.
Figure 4:
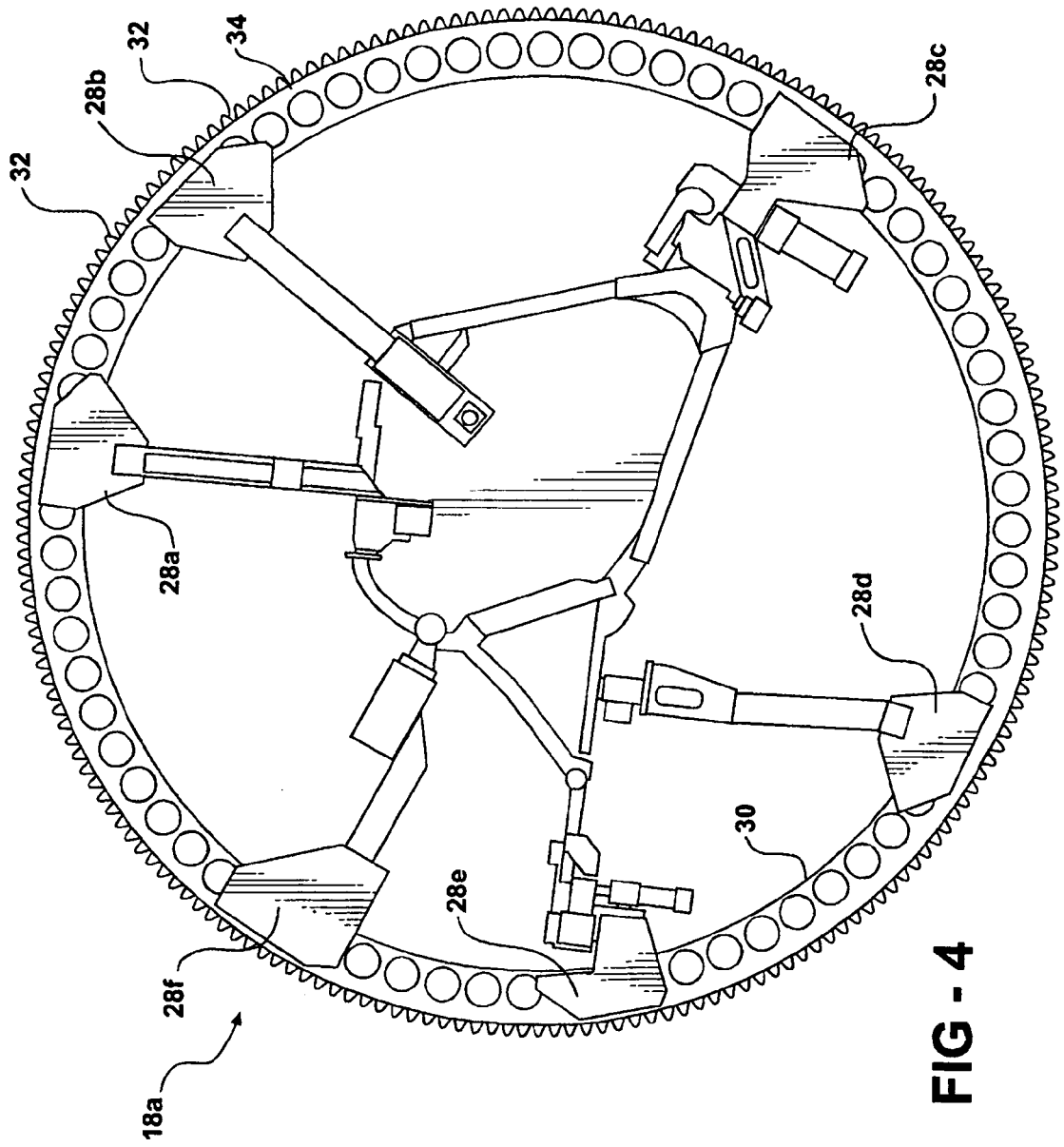
FIG. 4 is side view of a frame or ring having removable fixtures connected thereto for receiving a workpiece to be constructed according to the present invention.

Referring now to FIGS. 3 and 4, workpieces 11a, 11b can be installed within geometry fixtures carried by rotatable frames 18a, 18b. Each frame or ring 18a, 18b can support one or more elements 28a–28f defining each geometry-locating fixtures. The elements 28a–28f of each geometry fixture can be selected from one or more clamps, brackets, pins, grippers, guides or any combination thereof. Some of the elements 28a–28f of a geometry fixture can be powered by connection to an appropriate source of pneumatic, hydraulic or electric power. Powered elements of a geometry fixture associated with a corresponding rotatable frame or ring 18a, 18b can be engaged by a Staughbly system if desired. After the sub-assemblies and components corresponding to the workpiece 11a, 11b to be processed are loaded with respect to the elements 28a–28f of the geometry fixtures carried by the rotatable frame or ring 18a, 18b, the powered elements can be driven from a disengaged position to an engaged position for holding the relative geometry of the overall workpiece to be processed until the processing operations are complete. Lines 30 for the pneumatic, hydraulic and/or electric power can be mounted along a periphery of each rotatable frame or ring.

The elements 28a–28f defining each individual geometry fixture can be removably associated with the rotatable frame or ring 18a, 18b to accommodate a plurality of differently configured workpieces for assembling a plurality of differently configured motorcycle frames. The elements 28a–28f forming a geometry fixture can be exchanged with other elements or can be repositioned along the periphery of the frame or ring 18a, 18b with respect to one another for receiving and locating different sub-assemblies and/or components in a different predefined geometry with respect to one another during assembly. Each frame or ring 18a, 18b can include similar fixtures with respect to one another, or alternatively can include different fixtures for processing different workpieces at the same time. In certain circumstances, it may be desirable to associate a different geometry fixture with the frame or ring 18a than the geometry fixture associated with the frame or ring 18b to simultaneously assemble differently configured motorcycle frames on the same line.

Each frame or ring 18a, 18b includes a plurality of gear teeth 32 disposed along at least a portion of a periphery 34 of an arc segment connected to the frame or ring 18a, 18b. The teeth 32 allow controlled movement between angular positions with respect to an axis of rotation of each frame or ring 18a, 18b supported with respect to the associated pallet 20. The gear teeth 32 can be operably engaged by a drive gear to move the frame or ring 18a, 18b in rotation about the rotational axis with respect to corresponding pallet 20 and can be engaged by a lock to prevent relative rotational movement of the frame or ring 18a, 18b about the rotational axis with respect to the corresponding pallet 20 during movement of the pallet 20 along the conveyor 22.

Figure 5:
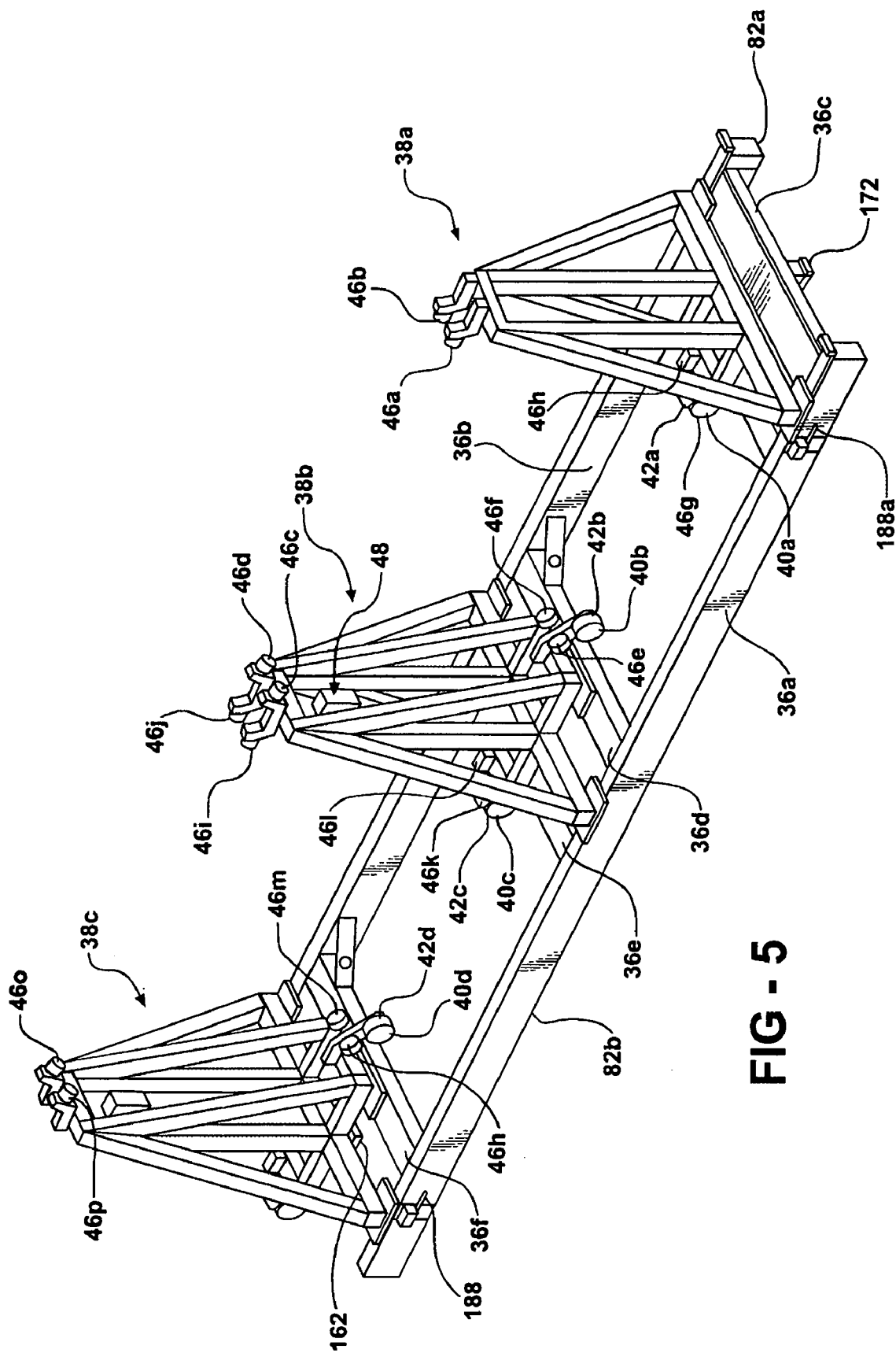
FIG. 5 is a perspective view of a pallet for carrying one or more frames or rings according to the present invention.

Referring now to FIGS. 1 and 5, each rotatable frame or ring 18a, 18b, can be rotatably supported by an associated pallet 20 for movement along the path 12. Each pallet 20 can include a plurality of horizontal frame members, 36a–36f and two or more vertical frame members 38a–38c. Each pallet 20 can also include a plurality of rollers for supporting the rotatable frames or rings 18a, 18b. Each pallet 20 can include rollers 40a–40b having support surfaces 42a–42b for engaging a surface 44a, as best shown in FIG. 3, of the corresponding rotatable frame or ring 18a, and rollers 40c–40d having support surfaces 42c–42d for engaging a surface 44b, as best shown in FIG. 3, of the associated rotatable frame or ring 18b. Aligning rollers 46a–46p can be provided on each pallet 20 for engaging the surfaces 45a–45b of the associated rotatable frames or rings 18a, 18b.

Figure 6:
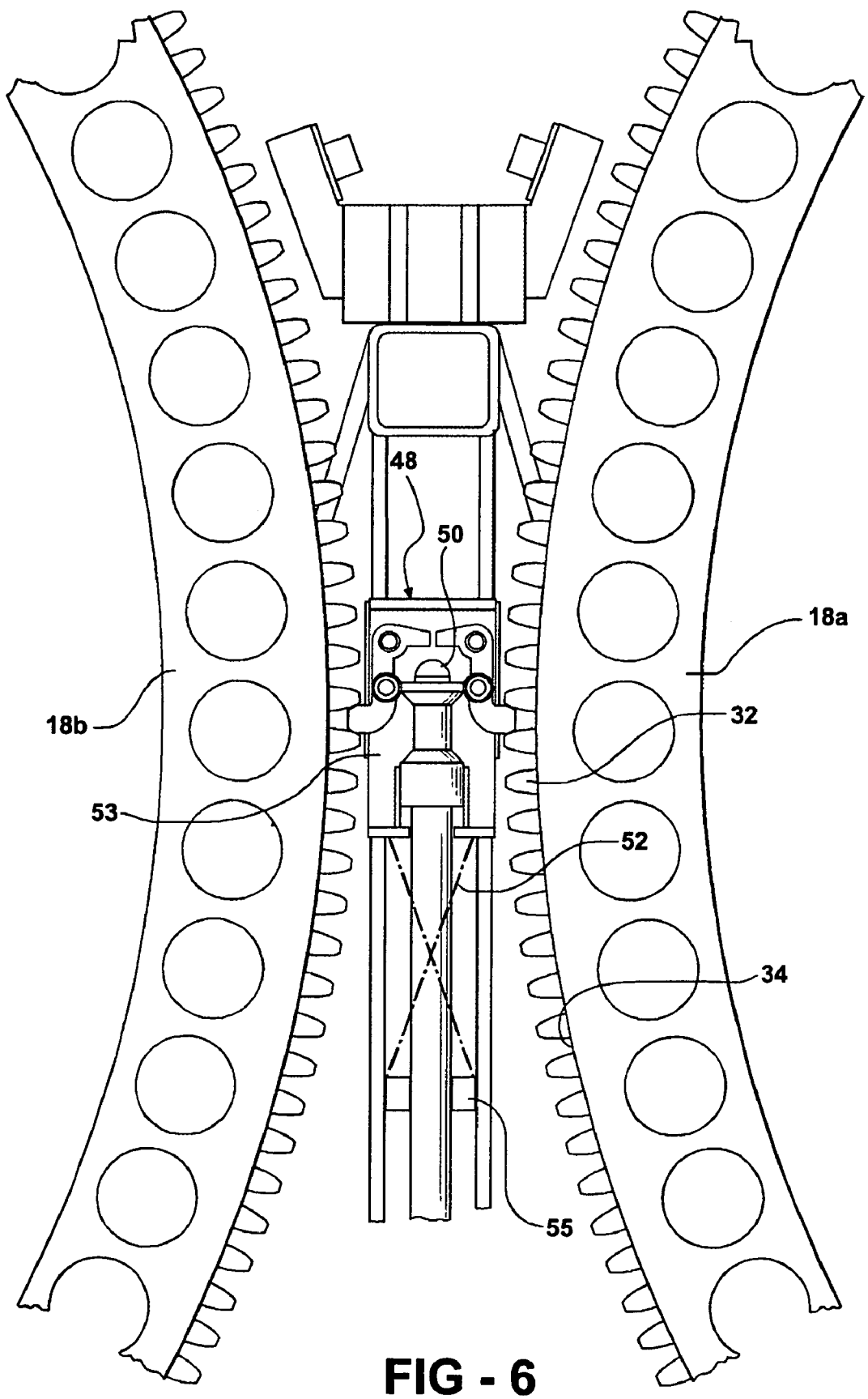
FIG. 6 is a detailed side view of a lock for locking one or more frames or rings with respect to the pallet according to the present invention.
Figure 8:
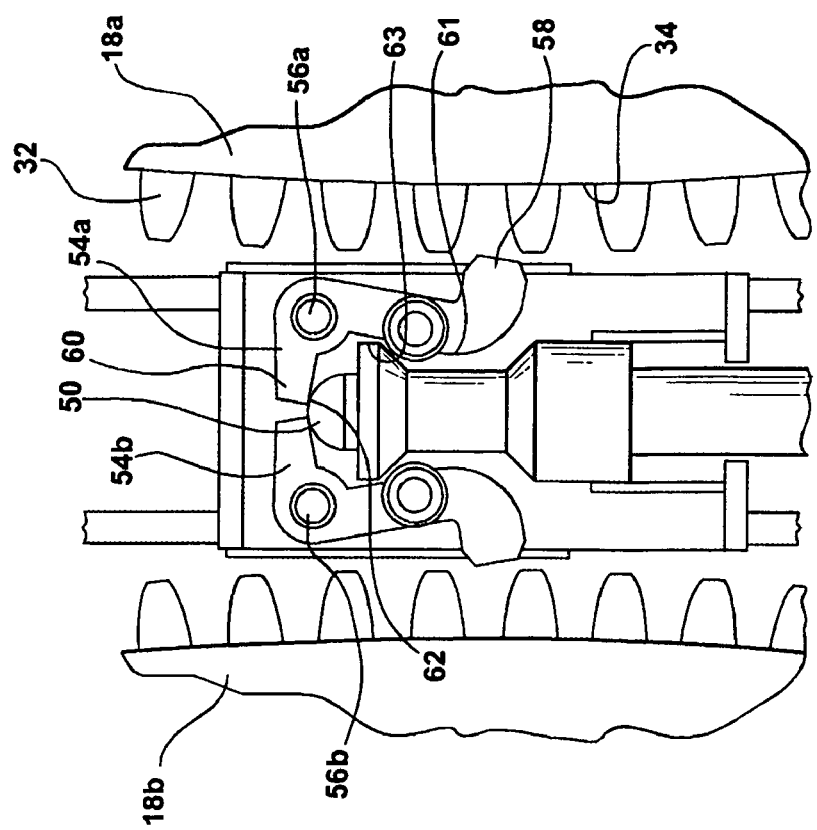
FIG. 8 is a sectional detailed sectional view of the lock in an unlocked position.
Figure 7:
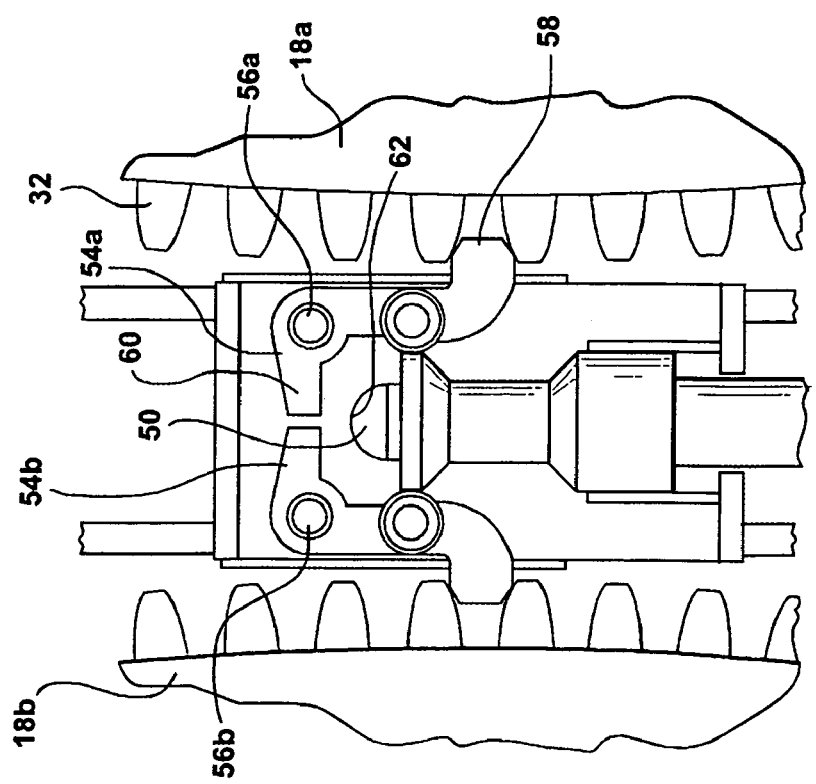
FIG. 7 is a detailed sectional view of the lock in a locked position.

Referring now to FIGS. 5–8, each pallet 20 can include a lock 48 to prevent the associated rotatable frame or ring 18a, 18b from rotating with respect to the pallet 20 during movement of pallet 20 along the path of travel 12. A lock 48 can be supported with respect to the vertical frame 38b of each pallet 20 between the rotatable frames or rings 18a, 18b. The lock 48 can be normally biased to the locked position. A lock-release actuator or key associated with a workstation can operably engage the lock 48, when the lock 48 is positioned at a workstation and movement of the rotatable frame 18a, 18b with respect to the pallet 20 is desired. The lock-release actuator or key can manipulate a pin 50 forming part of the lock 48. The pin 50 is moveable between a first position, normally locking the rotatable frames 18a, 18b with respect to the pallet 20, as best shown in FIG. 7, and a second position, releasing the rotatable frames 18a, 18b with respect to the pallet 20, as best shown in FIG. 8. FIG. 6 illustrates pin 50 in phantom in both positions. The locked position of the pin 50 corresponds to the normally biased position of the lock. The unlocked position of the pin 50 corresponds to the position when manipulated by the lock-release actuator or key. In one configuration, the locked position corresponds to the conveyor in the raised position, and the unlocked position corresponds to the conveyor in the lowered position. Alternatively, it should be recognized that the lock-release actuator or key could be moved relative to the pallet 20, while the conveyor 22 is stationary.

The lock 48 can include at least one arm rotatable about an axis in response to movement of the pin 50 between the locked position and the unlocked position. Preferably, the lock 48 includes at least one arm for each rotatable frame or ring 18a, 18b supported by the pallet 20. As shown in FIGS. 6 and 7, the lock 48 can include first and second arms 54a, 54b rotatable about corresponding axes 56a, 56b, respectively. Each arm 54a, 54b includes a first projection 58 for engaging the gear teeth 32 when the pin 50 is in the locked position as shown in FIG. 7. The first projection 58 is retracted with respect to the gear teeth 32 when the pin 50 is in the unlocked position as shown in FIG. 8. Each arm 54a, 54b includes a release lever 60. The release lever 60 is engaged by surface 62 of the pin 50. When pin 50 is moved to the unlocked position, the surface 62 engages the lever 60 to rotate the arms 54a, 54b about an axis of rotation causing retraction of the projection 58 with respect to the gear teeth 32 associated with the rotatable frame 18a, 18b. The arms 54a, 54b can include a follower surface 61 engageable with a cam surface 63 of the pin 50, as best seen in FIG. 8. When pin 50 is moved to the locked position, the cam surface 63 of the pin 50 engages the follower surface 61 of the arms 54a, 54b to rotate the arms 54a, 54b about the axis of rotation to cause locking engagement of projection 58 with respect to gear teeth 32.

Biasing means 52 urges the lock 48 toward the locked position, schematically shown in FIG. 6, causing pin 50 to normally be in the locked position with respect to the rotatable frame or ring 18a, 18b carried by the associated pallet 20 until acted on by the release actuator or key. Biasing means 52 can include a spring interposed between a pin housing 53 and a shoulder 55 formed on the pin 50. The rings 18a, 18b can be locked in a particular orientation with respect to the pallet 20 until reorientation is required. If various consecutive workstations require the workpiece to be in a common fixed angular orientation, processing operations can be optimized by locking the rotatable frames in a desired orientation while passing through the particular workstations.

Figure 9:
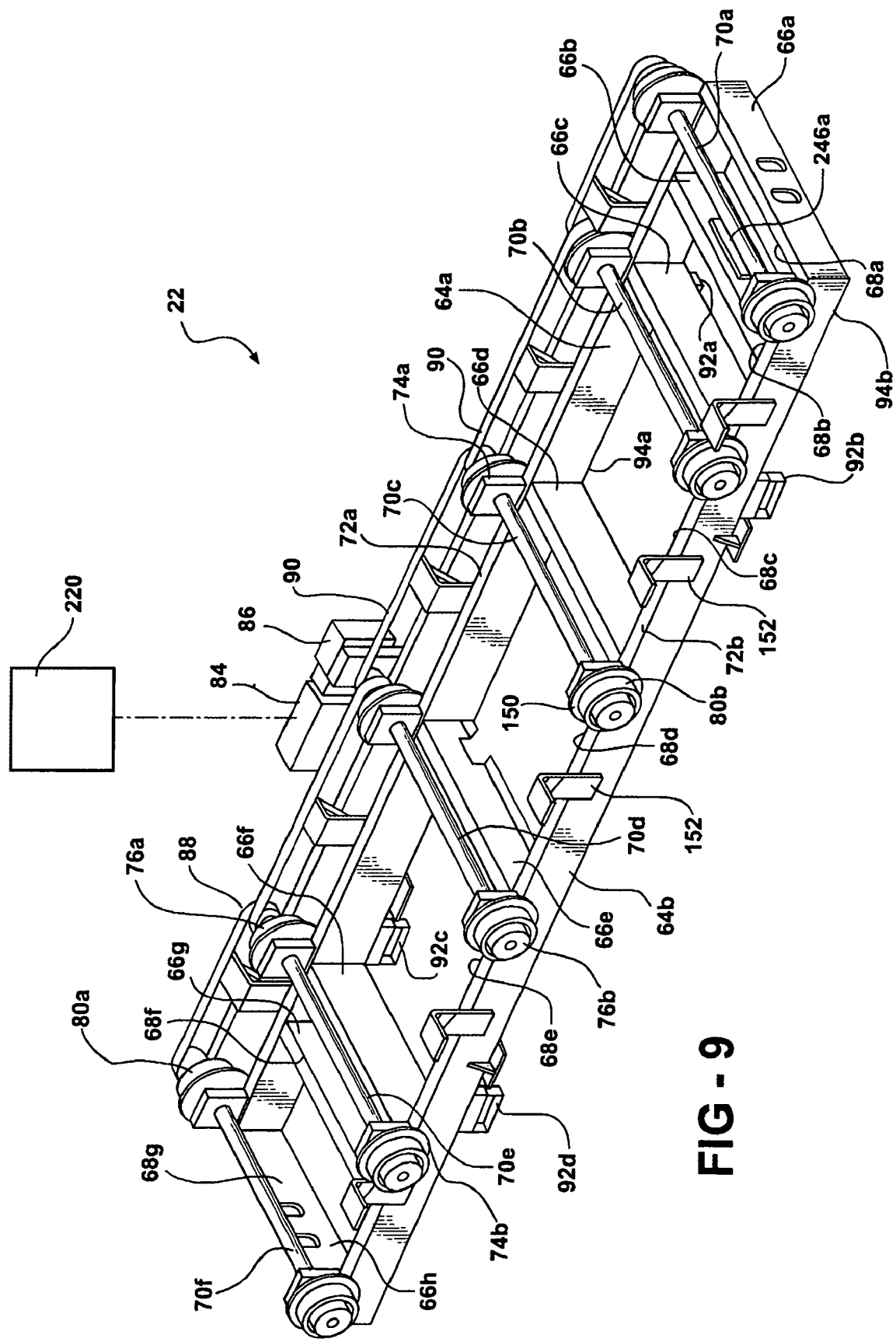
FIG. 9 is a perspective view of the conveyor according to the present invention.
Figure 13:
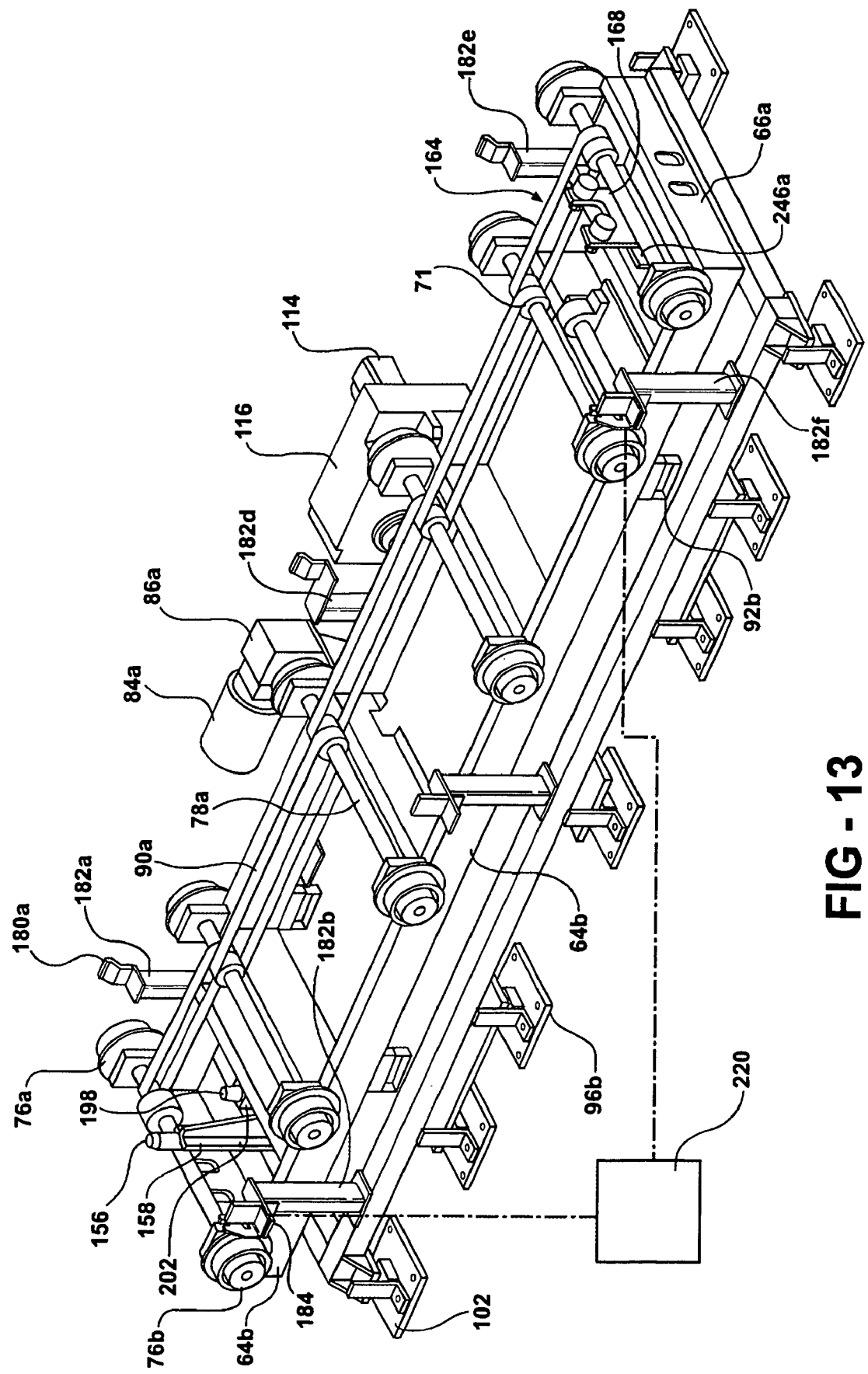
FIG. 13 is a perspective view of the conveyor engaged with positioning means for positioning the pallet with respect to the workstation and locating means for locating the conveyor with respect to the workstation.

Each pallet 20 can be moved along the path of travel 12 by the conveyor 22 having a plurality of sections. Referring now to FIG. 9, the conveyor 22 can include longitudinal members 64a and 64b and transverse members 66a–66h immovably associated with respect to one another. The longitudinal members 64a and 64b and the transverse members 66a–66h can define a plurality of apertures 68a–68g. A plurality of shafts 70a–70f, are provided on the conveyor 22 for moving pallets 20 along the path 12. Each shaft 70a–70f can be mounted along surfaces 72a, 72b of the longitudinal members 64a, 64b with bearings 74a, 74b. Each shaft 70a–70f supports a pair of drive wheels 76a, 76b, fixedly connected to the shaft. Each drive wheel 76a, 76b includes a corresponding support surface 80a, 80b, respectively, for engaging surfaces 82a, 82b of the pallet 20, as best shown in FIG. 5. The shafts 70a . 70f can be rotated by a drive motor 84 operably connected to a transmission 86 and one or more drive members, such as belts 90. Each shaft and associated drive wheels 76a, 76b can be driven by a pulley 88 fixedly connected to the shaft for operably engaging with a corresponding drive member, such as belts 90. The pulley 88 can be connected to one end of each shaft 70a–70f as best seen in FIG. 9, or alternatively, pulleys 71 can be fixedly connected on shafts 70a–70f interposed between the fixed wheels 76a, 76b, as best shown in FIGS. 13 and 16a–16b. In either case, the shafts 70a–70f and connected drive wheels 76a, 76b can be rotated in unison with respect to one another for transmitting linear motion to the pallet 20 carried on the drive wheels 76a, 76b. A drive motor 84a can be operably associated with a transmission 86a to directly drive one the shafts 70a–70f and drive at least one other shaft through associated drive members, such as belts 90a and pulleys 71. The conveyor 22 can also include brackets 92a–92d. Each bracket 92a–92d can be mounted to a surface 94a or 94b of the longitudinal members 64a, 64b. Each bracket 92a–92d defines an elongate slot or aperture for moving the movable section of the conveyor 22 between the first position and the second position with respect to the workstation.

Figure 10:
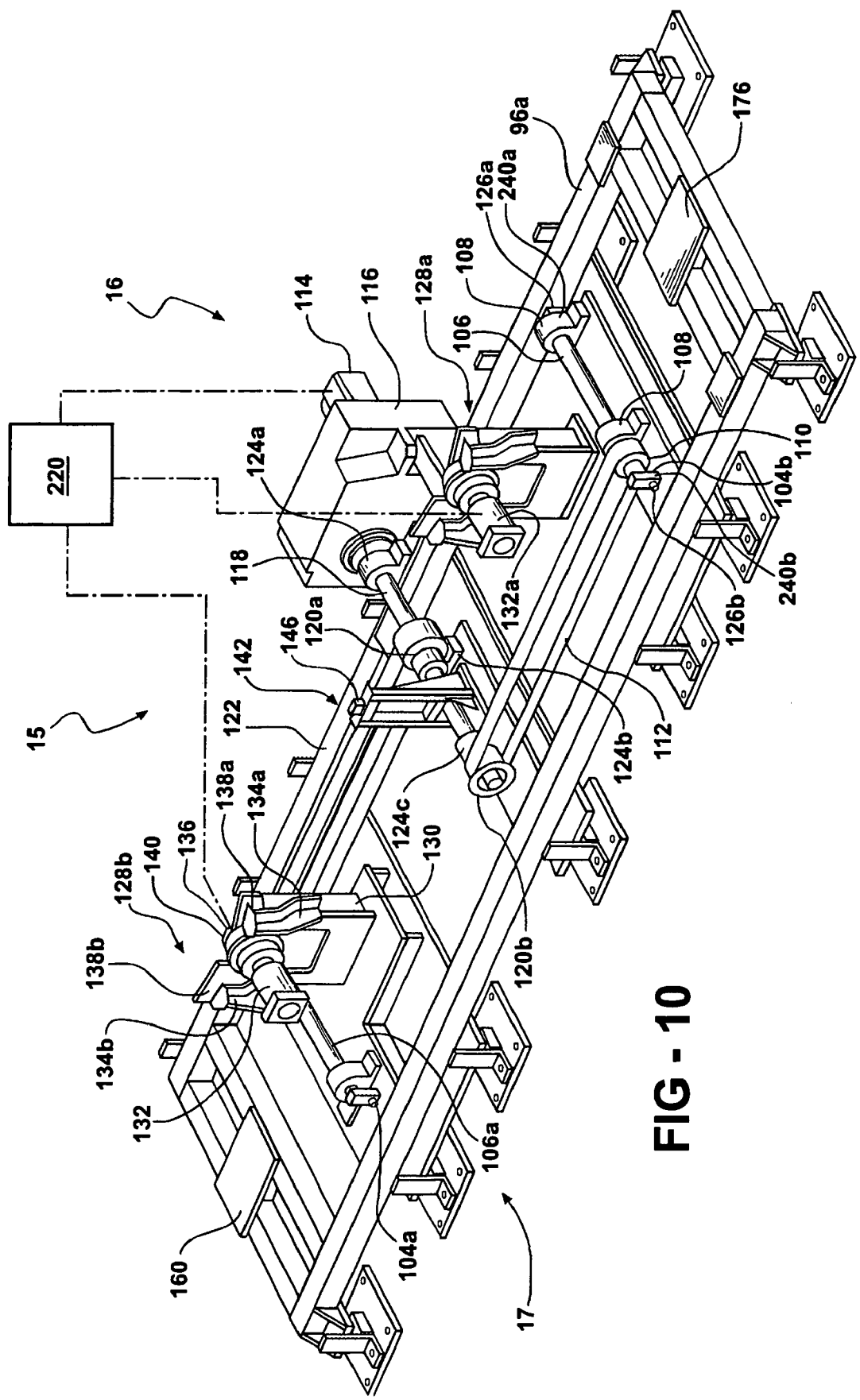
FIG. 10 is a perspective view of reorienting means according to the present invention.
Figure 11:
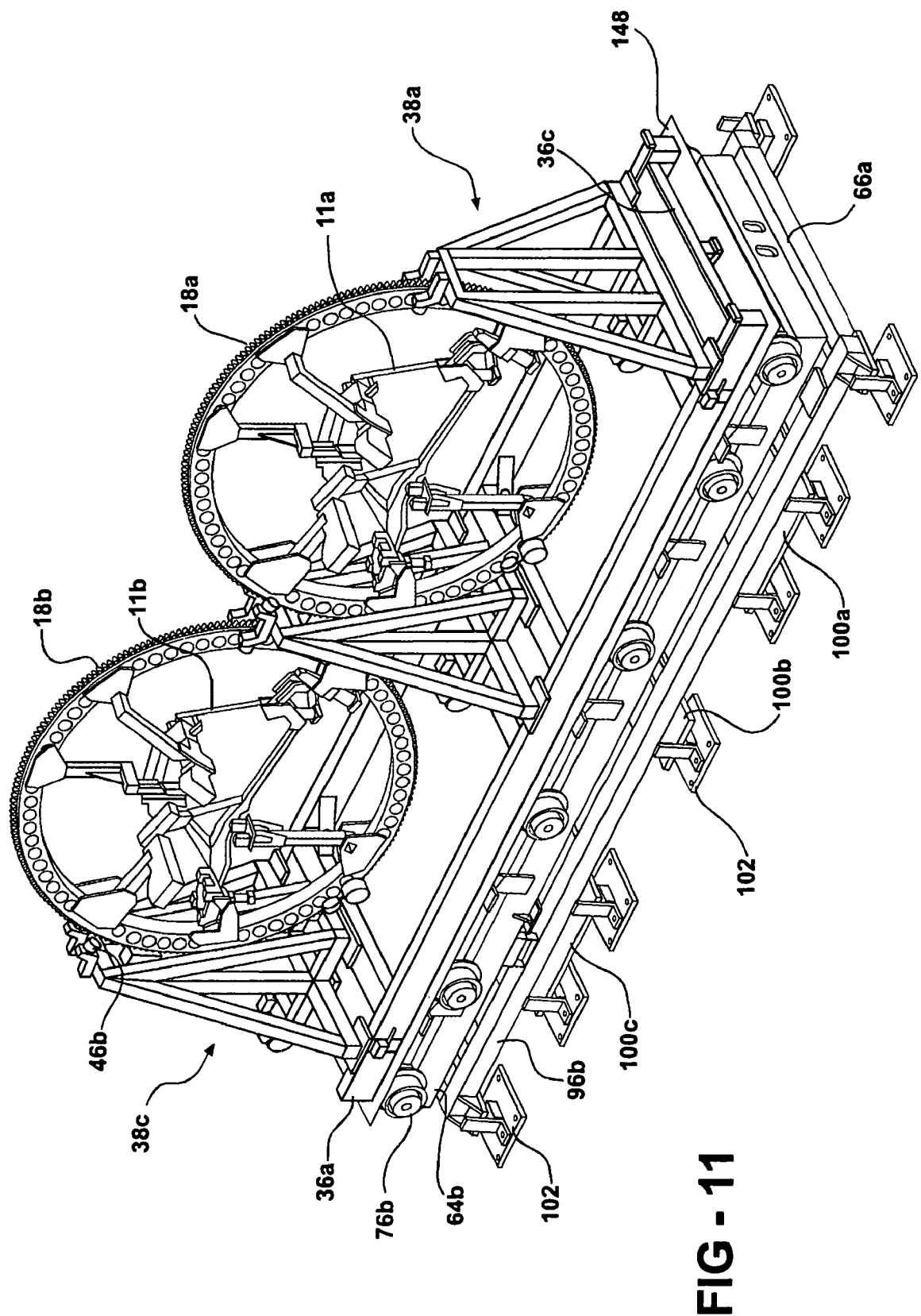
FIG. 11 is a perspective view of the pallet, conveyor and reorienting means engaged with respect to one another according to the present invention.

At least one section of the conveyor 22 is supported for movement with respect to workstation and/or adjacent stationary sections of the conveyor 22. Referring now to FIGS. 1, 10 and 11, a base 17 can support a vertical movement drive 104a, 104b for the movable section of the conveyor 22, ring drivers 128a, 128b, and a lock release actuator 142. The base 17 can be defined by longitudinal members 96a, 96b, transverse members 98, plates 100a–100c, and risers 102.

Vertical movement drive 104a, 104b can vertically move the section of the conveyor 22 between a first position and a second position relative to the base 17. The vertical movement drive, 104a, 104b can include a shaft 106 supporting a pair of rotatable members, such as a crank arm or disk, at each end. Each shaft 106 can include a roller or cam connected at a position spaced radially from the axis of rotation of the crank arm or disk. Each shaft 106 can be supported by bearings 108 mounted on one of the plates 100a or 100c. A pulley 110 can be fixedly connected to the shaft 106 for driving the fixedly connected crank arms or disks at each end of the shaft in simultaneous rotary motion. The pulley 110 can engage a drive member 112, such as a belt, for rotating the shafts 106 simultaneously with respect to one another to raise and lower the movable section of conveyor 22 and supported pallet 20 in a controlled manner for engagement with the base 17 and associated ring drivers 128a, 128b. The drive member 112 can be driven by a motor 114 operably connected through a transmission 116 for rotating a shaft 118 fixedly connected to pulleys 120a, 120b for driving the drive members 112, 122 and for transmitting rotary motion to the shafts 106. The rotary motion of each shafts 106 is converted into linear vertical motion of the movable section of the conveyor 22 through the rollers or cams engaging within the elongate slots or apertures formed in the brackets 92a–92d as best seen in FIG. 9. The shafts 106 can be supported through bearings 124a–124c.

Each cam or roller 126a, 126b is located at an end of the shaft 106. The cams or rollers 126a, 126b include crank arms 240a, 240b, respectively. The cams or rollers 126a, 126b are received within the elongate slots or apertures of the brackets 92a–92d of the movable section of the conveyor 22. The shafts 106, 106a and associated cams or rollers can be rotated between at least a first position and a second position. The first position corresponds to a raised position of the movable section of the conveyor 22 relative to the base 17. The second position corresponds to a lowered position of the movable section of the conveyor 22 relative to the base 17. In FIG. 10, the cams or rollers 126a, 126b are shown in the second, or lowered position. Preferably, the movable section of the conveyor 22 moves vertically with respect to the base 17, while movement transverse and/or longitudinal with respect to the path of travel 12 is prevented with appropriate guides and/or supports as required.

Reorienting means 15 can include ring drivers 128a and 128b for moving the rotatable frames or rings 18a, 18b when the movable section of the conveyor 22 is in a lowered position relative to the base 17. Each ring driver 128a, 128b can be mounted to corresponding plate 100a, 100c. Each ring driver 128a, 128b includes a body 130, a motor 132, frame supports 134a, 134b, and a drive gear 136. The body 130 positions the drive gear 136 having gear teeth 140 in intermeshing engagement with the gear teeth 32 of the corresponding rotatable frame or ring 18a, 18b when the associated pallet 20 and the movable section of the conveyor 22 are lowered relative to the base 17 at the workstation. The drive motor 132 rotates the drive gear 136 causing corresponding rotation of the rotatable frame or ring 18a, 18b when the movable section of the conveyor 22 is in the lowered position. The frame supports 134a, 134b include wear pads 138a, 138b, respectively, engageable with surface 44a, 44b of the corresponding rotatable frame or ring 18a, 18b when the associated pallet 20 and the movable section of the conveyor 22 are lowered relative to the base 17 of the workstation.

Figure 12:
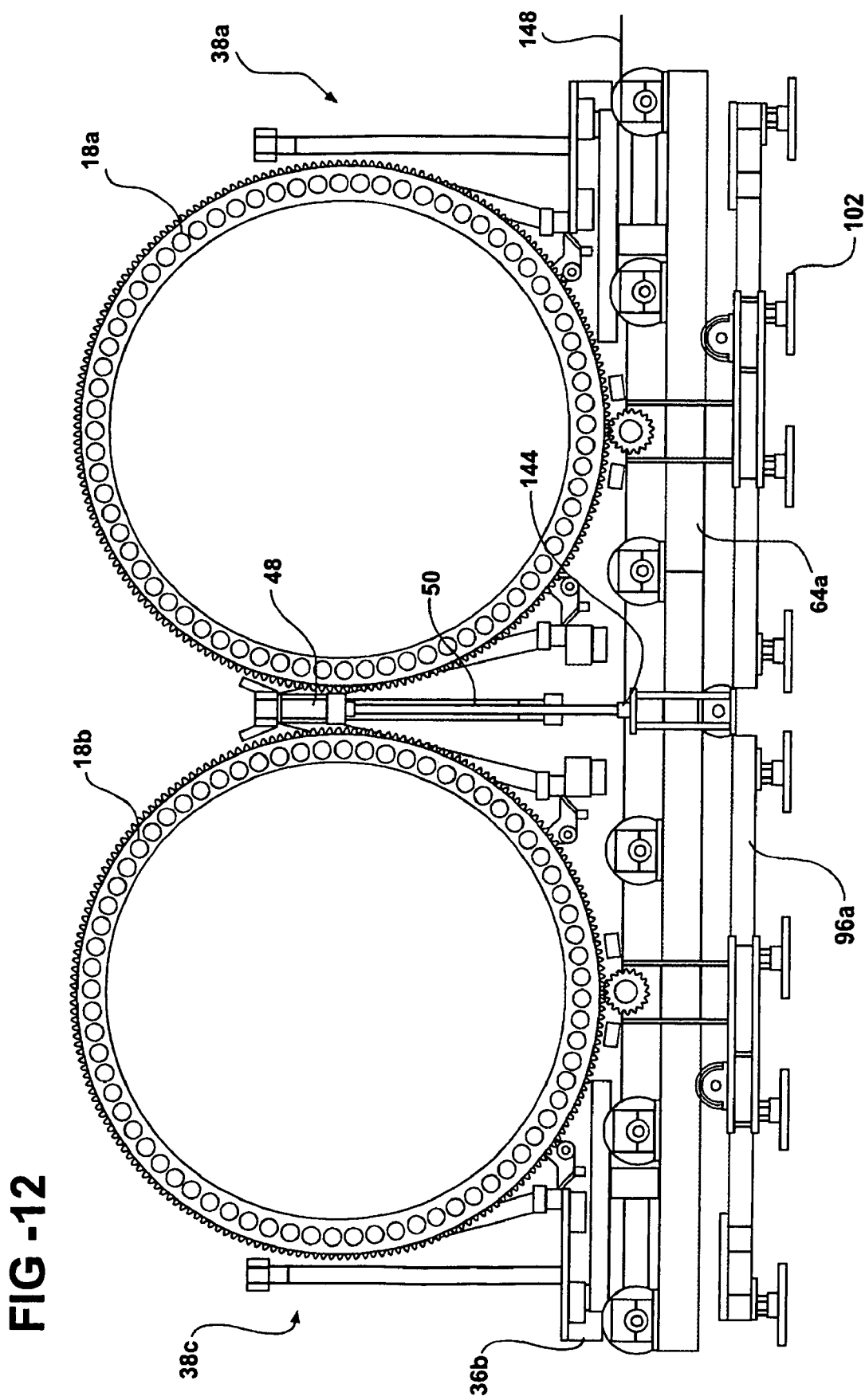
FIG. 12 is a side sectional view of the pallet, the conveyor and the reorienting means engaged according to the present invention.

Referring now to FIGS. 10 and 12, the reorienting means 15 can include a lock release actuator 142 engageable with a lower end 144 of the pin 50 for moving the pin 50 against the urging of the biasing means 52 toward the second position as the pallet 20 and movable section of the conveyor 22 are lowered relative to the base 17. As the movable section of the conveyor 22 is lowered relative to the base 17, the lower end 144 of the pin 50 engages the lock release actuator 142 to move the pin 50 to the unlocked position when the movable section of the conveyor reaches the lowered position. The lock release actuator 142 can include a replaceable wear pad 146 for engaging the lower end 144 of the pin 50.

Referring now to FIGS. 11 and 12, a plate 148 can be disposed adjacent a top portion of the movable section of the conveyor 22. The plate 148 defines a plurality of apertures allowing flanges 150 and surfaces 80a, 80b of wheels 76a, 76b to engage pallet 20 through the apertures. Ring drivers 128a, 128b are allowed to engage rotatable frames or rings 18a, 18b, and lock release actuator 142 is allowed to engage lock 48 through the apertures. The plate 148 prevents entry of debris into contact with belts 90, 112, 122 and pulleys 88, 110, 120a associated with the movable section of the conveyor 22 and base 17. The plate 148 can be supported by brackets 152 mounted to the longitudinal members 64a and 64b of the movable section of the conveyor 22.

Figure 14:
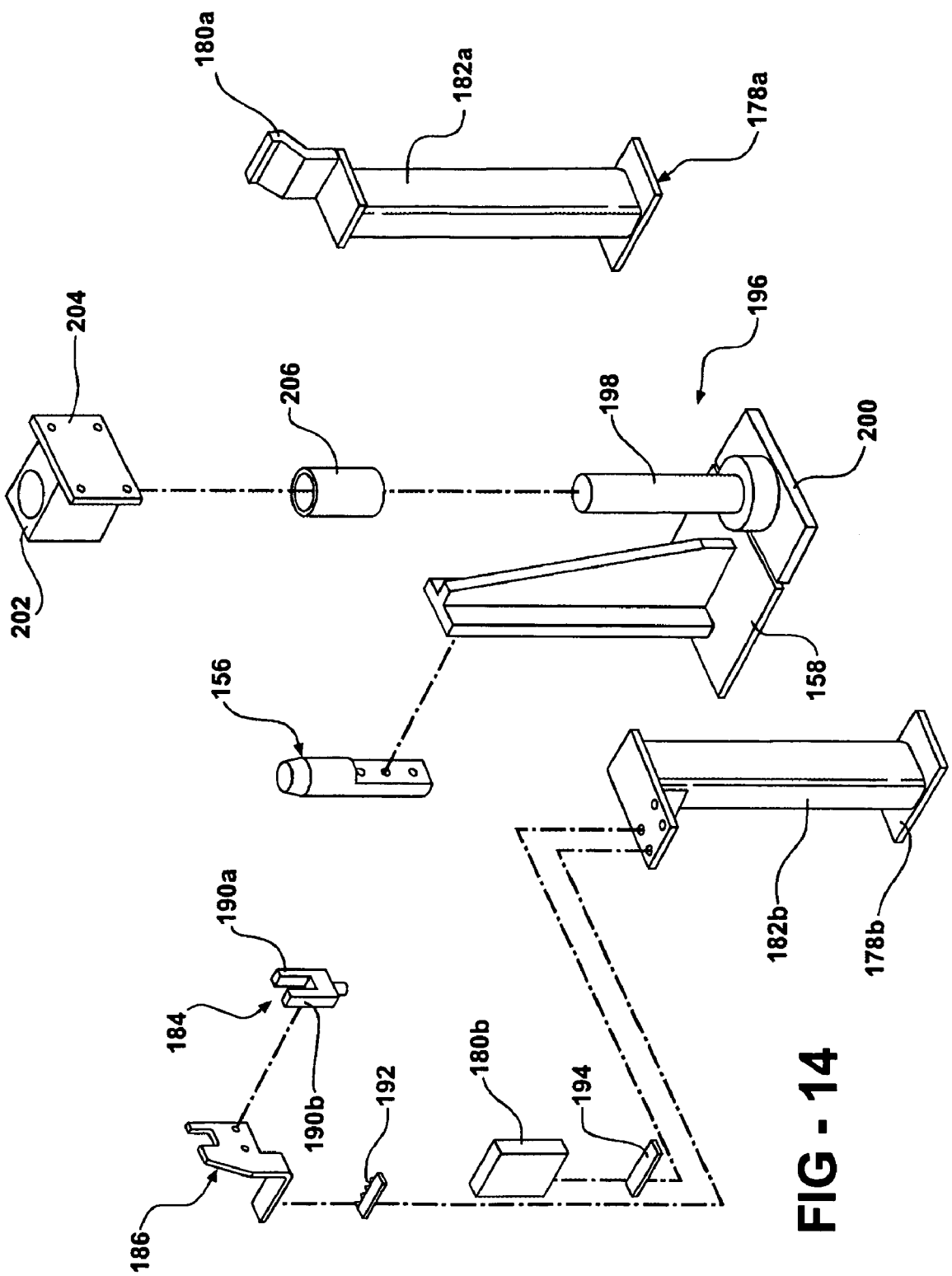
FIG. 14 is a partial exploded view of positioning means and locating means according to the present invention.
Figure 15:
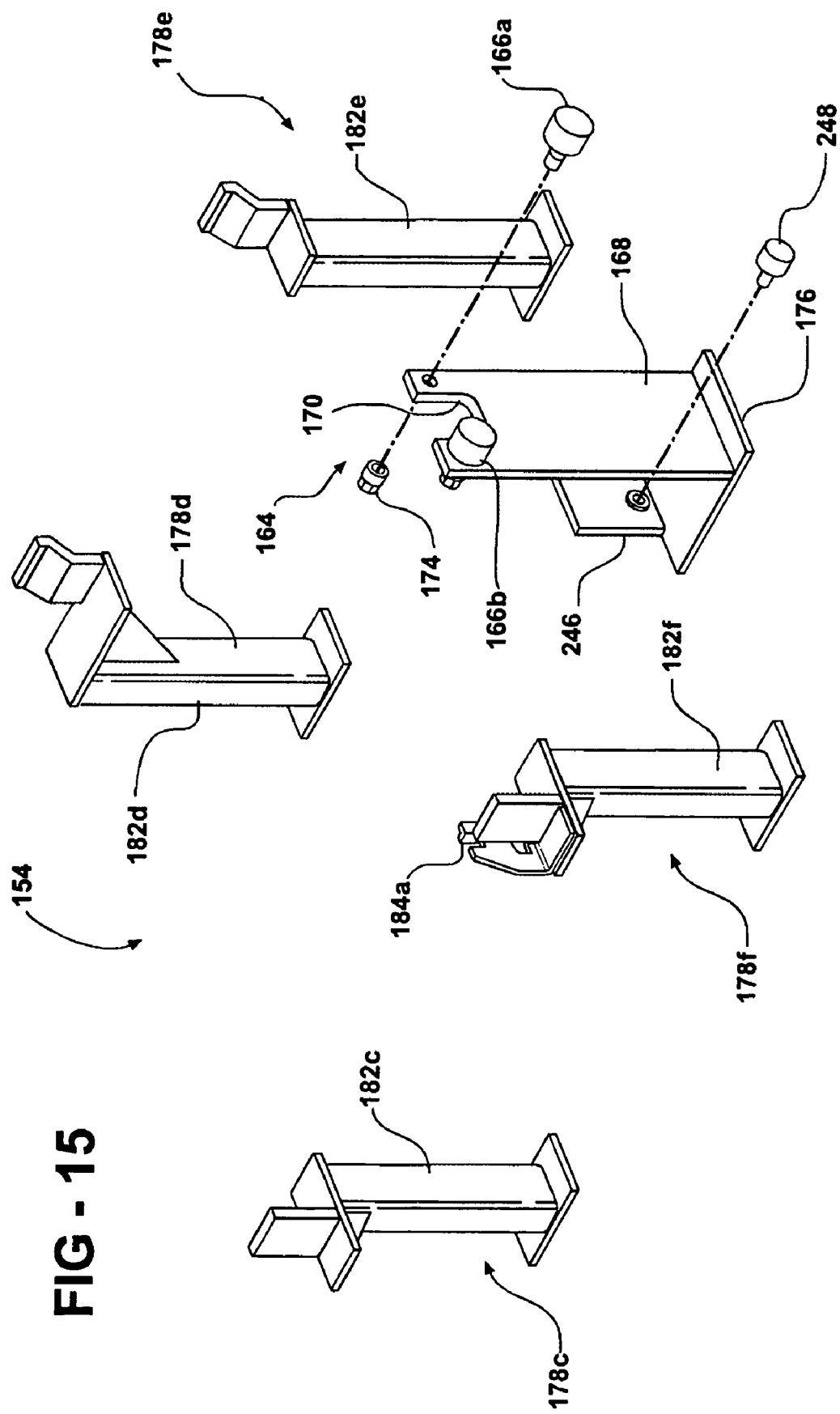
FIG. 15 is partial exploded view of positioning means and locating means according to the present invention.

Referring now to FIGS. 13–15, the present invention includes positioning means 16 for locating the pallet 20 with respect to the base 17 when the pallet 20 and movable section of the conveyor 22 are lowered relative to the base 17. Positioning means 16 can include a first locating pin 156 mounted with respect to a riser 158. The pin 156 can be tapered to accommodate slight misalignments between the pallet 20 and the pin 156. The riser 158 can be mounted to a plate 160 associated with the base 17, as shown in FIG. 10. The pin 156 can be located at a downstream end of the base 17 with respect to flow of workpieces 11a, 11b along the path of travel 12. The pin 156 operably engages within an aperture 162 located on an underside of the pallet 20, best shown in FIG. 5. The pin 156 accurately locates the pallet 20 and associated workpieces carried by the geometry fixtures of the rotatable frames and rings 18a, 18b with respect to the automated processing equipment associated with the workstation, such as programmable robots for automated welding operations. The pin 156 prevents transverse or side-to-side movement of the pallet 20 as well as longitudinal or upstream and downstream movement of the pallet 20 when engaged. Accurately locating consecutive workpieces with respect to the workstation as the workpieces move along the path of travel during processing is critical in order to provide a repeatable, high quality processed workpiece at the end of the assembly line. Minor variations in positioning of the workpieces at the workstations can introduce undesirable variations in the quality of the finished workpieces.

The pallet positioning means 16 can include roller guides 164. The roller guides 164 include rollers 166a, 166b rotatably mounted to a plate 168. The plate 168 includes a slot 170 for receiving a locating member 172 of the pallet 20, as best seen in FIG. 5. The locating member 172 moves between the rollers 166a, 166b as the pallet 20 is lowered relative to the base 17. The rollers 166a, 166b can be connected to the plate 168 with appropriate fasteners, such as nuts 174. The plate 178 can be mounted with respect to a plate 176 on the base 17.

The pallet positioning means 16 can also include guides 178a–178f. Each guide 178a–178f can include a guide plate 180a, 180b (FIG. 13–15) and supports 182a–182f for positioning the guide plate in a desired position relative to the base 17. The horizontal frame member 36b of the pallet 20 engages the guide plates 180*a*, 180*b* as the pallet 20 is being lowered relative to the base 17 to locate the pallet in a direction transverse to the flow of workpieces along the path 12. Guides 178*a*–178*f* can be mounted on the longitudinal members 96*a* and 96*b* of the base 17.

Figure 18:
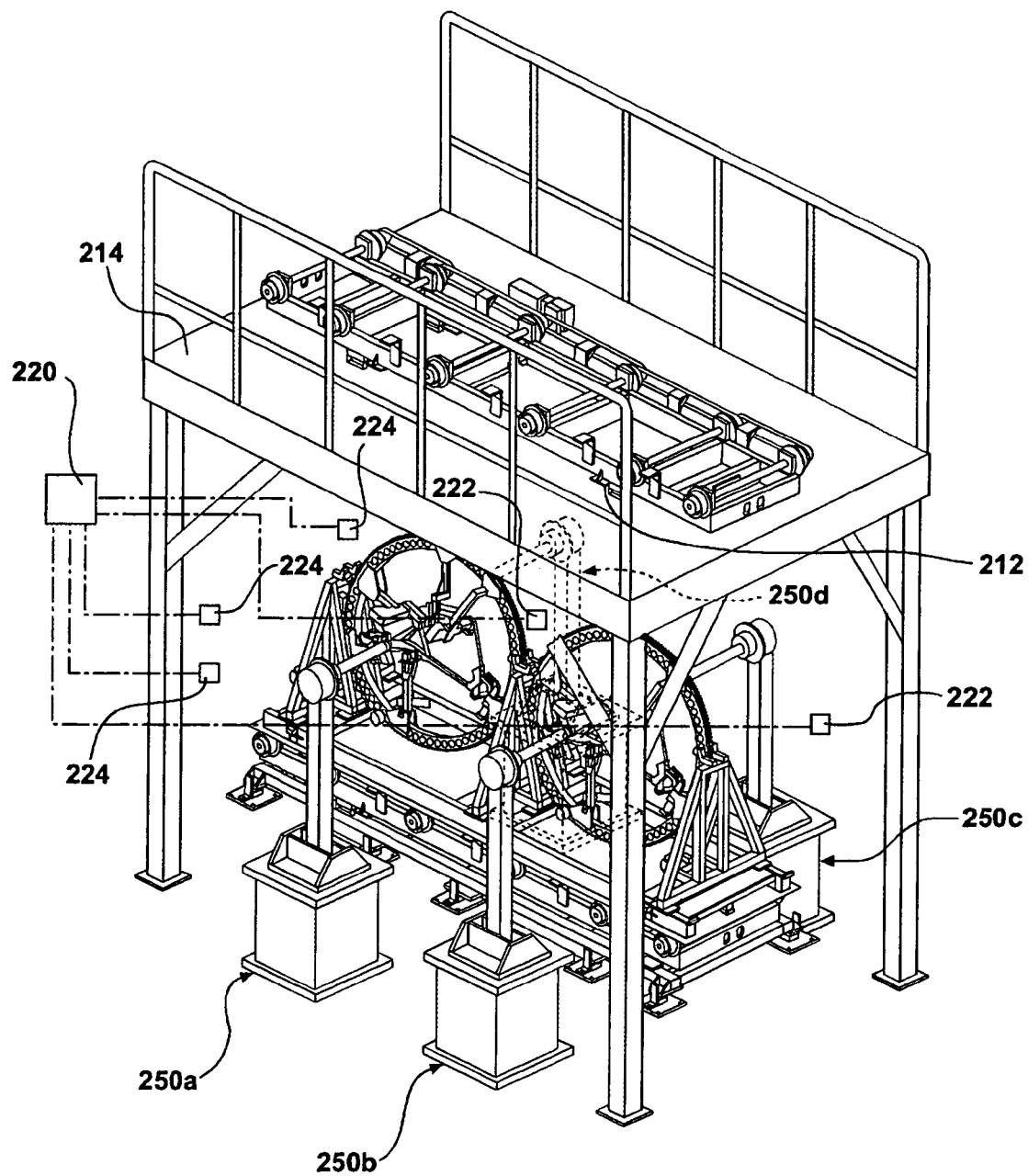
FIG. 18 is a perspective view of a workstation according to the present invention.

One or more guides 178*b*, 178*f* can include a sensor for sensing the proximity of the pallet 20. A projection 188, 188*a* formed on the pallet 20, as best seen in FIG. 5, can move between the prongs 190*a*, 190*b* of a sensor 184, 184*a* (FIGS. 14 and 15 respectively) as the pallet 20 is lowered with respect to the base 17. The sensor 184, 184*a* can emit a signal corresponding to proximity of the projection 188, 188*a* to the sensor, where the emitted signal is received by a controller 220 (FIGS. 13 and 18). Sensor 184, 184*a* can be mounted to any appropriate guide with a bracket 186 and a spacer element 192. The plate 180*b* can be mounted to the beam 182*b* with a spacer element 194. The pallet positioning means 16 can be located at each workstation where automated processing is to be performed on the workpiece requiring repeatable, accurate location of the workpiece relative to the workstation. At these workstations, the pallet 20 is lowered relative to the base 17 to operably engaging the pallet positioning means 16 located at the workstation.

A conveyor locating or guiding means 196 (FIGS. 13 and 14) prevents transverse and longitudinal movement of the movable section of the conveyor 22 relative to the base 17 as the movable section of the conveyor 22 is lowered with respect to the base 17. Conveyor locating means 196 can include a guide rod 198 rigidly mounted to a base 200. The base 200 is mounted to the plate 160 of the base 17. The conveyor locating means 196 includes a slide block 202 having an aperture formed therein for slidably receiving the guide rod 198 to move longitudinally along a length of the guide rod 198 as the movable section of the conveyor 22 and supported pallet 20 are moved between the raised position and lowered position. A plate 204 is mounted to the slide block 202. The plate 204 is connected to the transverse member 66*g* of the movable section of the conveyor 22 to prevent relative movement in any direction except vertical movement between the base 17 and the movable section of the conveyor 22. A bushing 206 can be located within the aperture of the slide block 202 to enhance the sliding movement of the slide block 202 relative to the guide rod 198.

The conveyor locating means 196 can include a plate 246 and roller 248, best seen in FIG. 15. The plate 246 can be mounted with respect to the stationary member 176 mounted on the base 17. The roller 248 can engage a plate 246*a* (FIGS. 9 and 13) associated with the movable section of the conveyor 22. The plate 246*a* operably engages the roller 248 to locate the movable section of the conveyor 22 with respect to the base 17.

Figure 16:
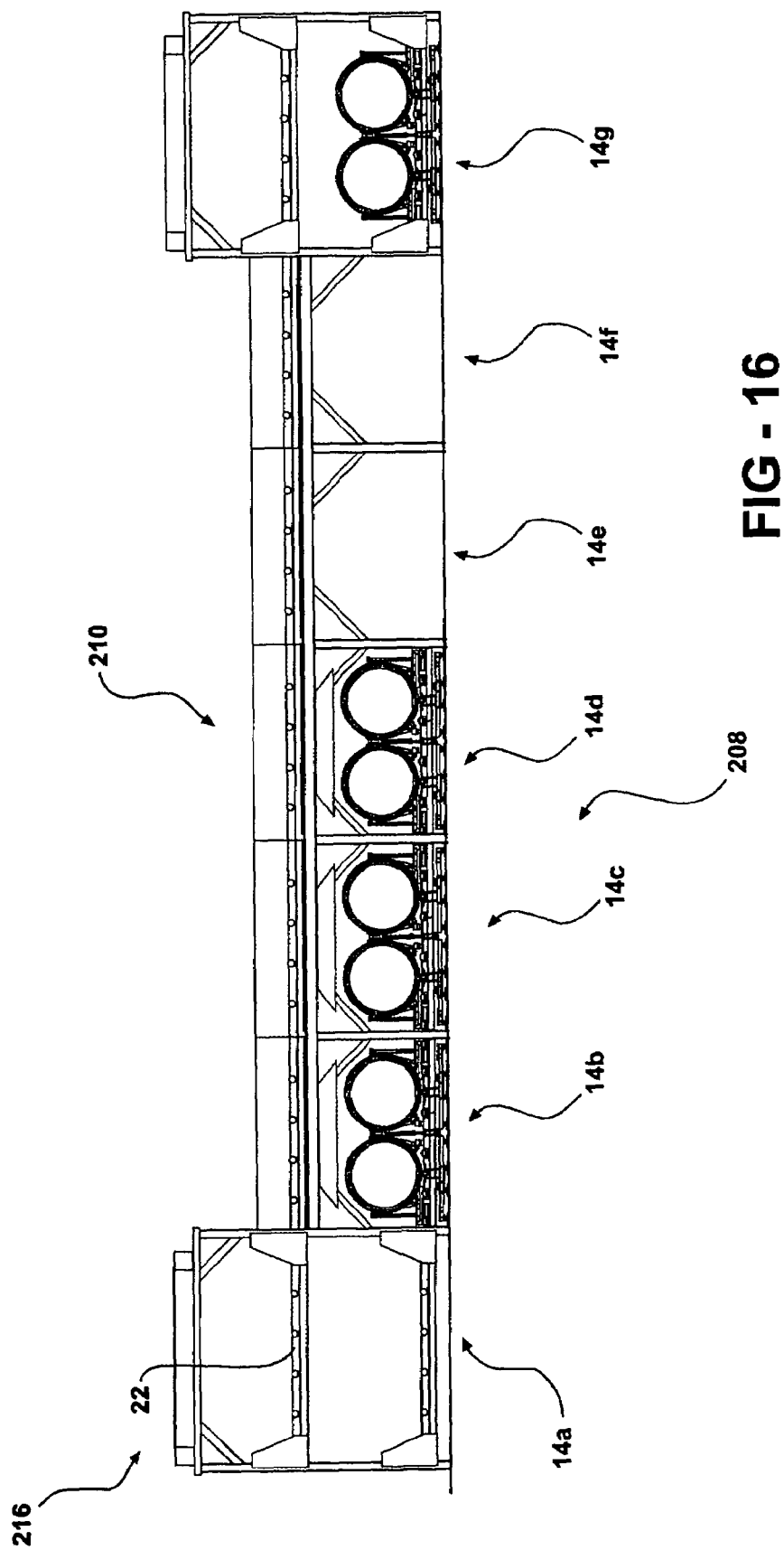
FIG. 16 is a side view of an assembly line according to the present invention.

Referring now to FIGS. 2 and 16, an assembly line according to the present invention includes workpiece conveyance means 10 defining the path of travel 12 and having workstations 14*a*–14*g* positioned along the path of travel 12. Workstation 14*a* can define a pallet receiving station where empty pallets 20 are positioned prior to loading workpieces 11*a*, 11*b* at the loading workstation 14*b*. Workstations 14*c*, 14*d* can define welding workstations for fixing the geometry of the individual sub-assemblies and components into a unitary one-piece frame while held in the geometry fixtures carried by the rotatable frames or rings 18*a*, 18*b*. Processing operations can be performed with respect to the workpieces 11*a*, 11*b* along the entire assembly line while the sub-assemblies and/or components are held in a geometry fixture ensuring accurate location of the individual components and/or sub-assemblies with respect to one another throughout the assembly process. Inspection of workpieces, unloading of workpieces, or any other operation can be performed with respect to the workpieces 11*a*, 11*b* at workstations 14*e*, 14*f*. Workstation 14*g* can define a pallet return workstation.

The path of travel 12 can include a first portion 208 corresponding to the pallet 20 moving through workstations 14*b*–14*f*. The path of travel 12 can include a second portion 210 corresponding to the pallet being returned to the loading workstation 14*b*. The second portion 210 can be located as an overhead return line, a below floor return line, or as a return loop line at floor level with respect to the first portion 208 depending on the particular application and plant layout. As illustrated in FIG. 16, by way of example and not limitation, when a pallet 20 reaches the workstation 14*g* at the end of the assembly line, the pallet 20 can be raised to an upper level and returned along a series of conveyor sections defining the second portion 210 positioned above the first portion 208. The workstation 14*g* can include a lift 216 for moving the movable section of the conveyor 22 between a raised position aligned with the conveyor sections of the conveyor 22 associated with the second portion 210 and a lowered position aligned with the conveyor sections of the conveyor 22 associated with the first portion 208. The workstation 14*g* can include drive means for raising the lift 216 along with the movable section of the conveyor 22 and a pallet 20 supported on the movable section of the conveyor 22 into alignment with the second portion 210 of the path of travel 12. After the pallet 20 has been moved to the raised position into alignment with the second portion 210 of the path of travel 12, the drive means can be actuated to operate lift 216 to move the movable section of the conveyor 22 to the lowered position into alignment with the first portion 208 of the path of travel 12. The elevated sections of the conveyor 22 positioned along the second portion 210 of the path of travel 12 can be supported by simplified elevated bases, since pallet positioning means 16 and conveyor locating means 196 are not required on the return line. The elevated sections of conveyor 22 can be connected with supports 212 to an elevated platform surface 214, as shown in FIG. 18.

At the workstation 14*a*, a returning pallet 20 is received from the second portion 210 of the path of travel 12 and can be lowered into alignment with the first portion 208 of the path of travel 12 for delivery to the loading workstation 14*b*. The workstation 14*a* can include another lift 216 including a movable section of the conveyor 22 for supporting a pallet 20. During production changeover, or whenever maintenance is required, one pallet can be exchanged for another pallet at workstation 14*a* and/or workstation 14*g*. To perform an exchange of pallets at workstation 14*a* and/or 14*g*, a first pallet is received at the lift station 14*a* and/or 14*g*, when in a pallet removal position (typically the lowered position) the pallet can be transferred to an adjacent loading/unloading conveyor position (not shown) for removal, and after removal another pallet 20 can be loaded into the loading/unloading conveyor position (not shown) for transfer to the lift station 14*a* and/or 14*g*. To increase the speed and efficiency of pallet maintenance and/or production model changeover, one lift workstation 14*a* and/or 14*g* can be used to remove pallets 20 while the other lift workstation is used to load replacement pallets 20. It should be recognized that the rotatable frames or rings 18*a*, 18*b* can be exchanged with respect to the pallet 20 at the lift workstations 14*a* and/or 14*g*, or at an adjacent loading/unloading workstation (not shown). It should also be recognized that the fixtures 28*a*–28*f* can be exchanged with respect to the rotatable frames or rings 18a, 18b at the workstations 14a or 14g, or at an adjacent reconfiguration workstation (not shown). Any one or more of the pallets 20, rotatable frames or rings 18a, 18b, and elements 28a–28f defining geometry fixtures can be exchanged to move workpieces with a different geometry configuration along the path of travel 12 for assembly allowing greater flexibility in the production line configuration and mix of models being manufactured.

Figure 17:
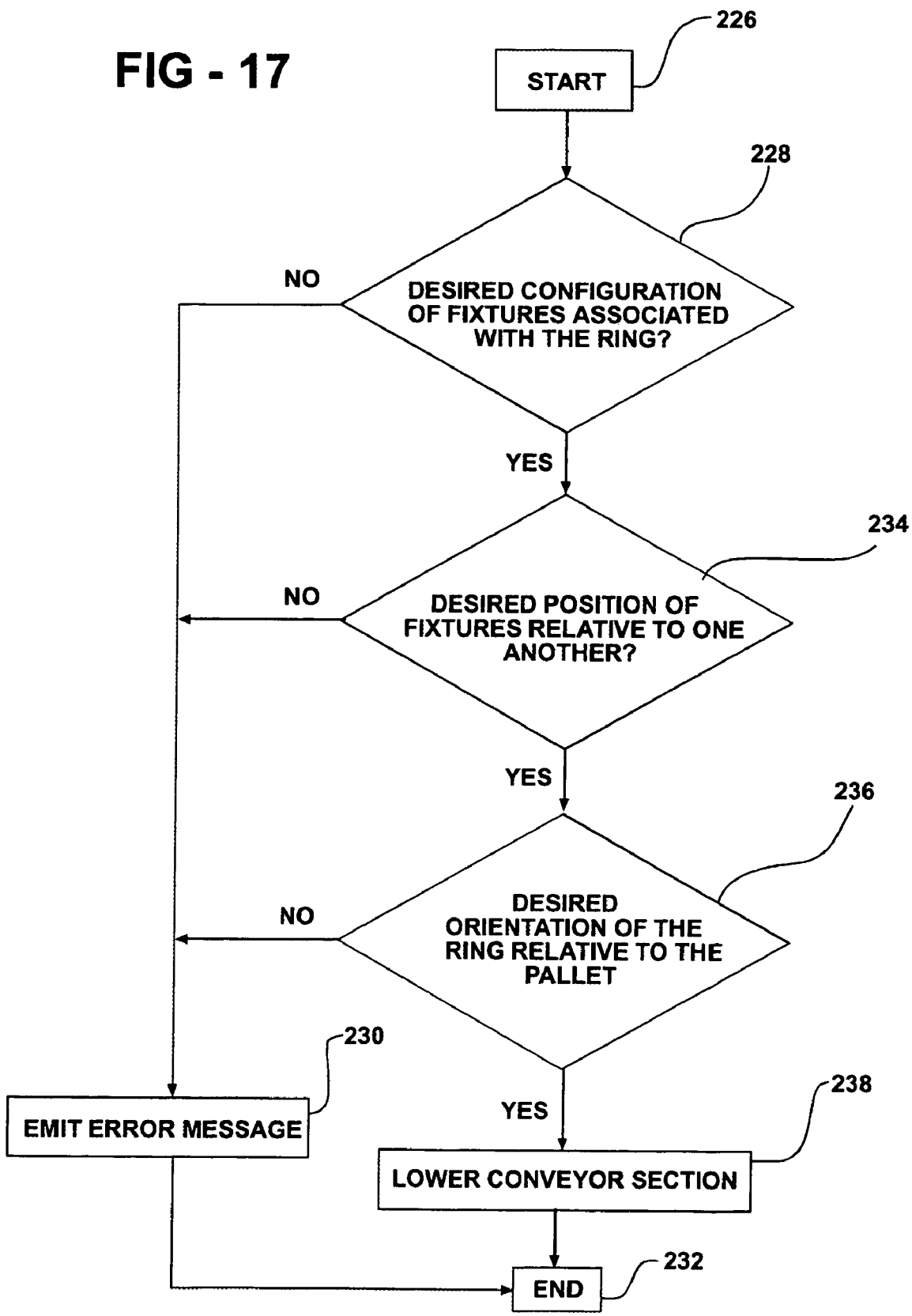
FIG. 17 is a simplified flow diagram illustrating steps performed when a pallet is moved with respect to a workstation.

Referring now to FIG. 17, movement of the pallet 20 into one of the workstations 14b–14f can begin by movement of the wheels 70a–70f of the movable section of the conveyor 22 of the previous workstation to rotate and move the pallet 20 to the movable section of the conveyor 22 of the receiving workstation. The receiving workstation can include one or more position sensors 222 for emitting a signal corresponding to the position of the pallet 20 relative to the movable section of the conveyor 22. The signals emitted by the position sensors 222, and position sensors 184, 184a (FIGS. 13 and 14) can be received by a controller 220 in communication with the motor 84. The controller 220 can control the motor 84 to decelerate the pallet 20 and stop the pallet at a predetermined position. After the pallet has been stopped, one or more sensors 224 emit signals corresponding to one or more of the following data: a unique identification for the workpiece being assembled; a unique identification of the individual pallet with respect to the plurality of pallets being transported by the conveyor 22; a unique identification of an individual rotatable frame or ring with respect to the plurality of rotatable frames or rings being transported on the conveyor; a unique identification of the particular configuration of the elements forming the geometry fixture associated with the particular rotatable frame or ring; the relative position of each element of the geometry fixture support by the rotatable frame or ring relative to other elements of the geometry fixture; and the angular orientation of the rotatable frame or ring and associated elements of the geometry fixtures relative to supporting pallet. Preferably, the sensors 224 are optical scanners, or laser switches or sensors. However, the sensors 224 can be any type of sensor, such as an optical sensor, or a programmable chip with data transfer capabilities associated with each pallet, each rotatable frame and each geometry fixture configuration.

The unique identification of an individual pallet or an individual rotatable frame or ring among a plurality of pallets and frames or rings can be stored in memory of the controller 220 for analysis. The analysis can assist in determining the cause or source of rejected workpieces which can be cross-referenced to the individual pallet and individual frame or ring that moved the workpiece along the path 12 to identify any pallets, frames or rings that may be incorrectly configured or damaged. The sensors 224 can identify the configuration of elements 28a–28f forming each geometry fixture on each ring 18a, 18b, the position of the elements 28a–28f of each geometry fixture relative to one another, and the angular orientation of the rotatable frames or rings 18a, 18b relative to the pallet 20. The controller 220 can compare the signals received from the sensors and apply the signals in accordance with a control program stored in memory. The control program stored in memory can include data corresponding to a desired configuration of the elements forming each geometry fixture, a desired number of elements and the desired position of the elements relative to one another for forming a particular geometry fixture, and a desired angular orientation of the rotatable frame or rings 18a, 18b relative to the pallet 20. If the signals emitted by the sensors and received by the controller 220 do not correspond to the desired configuration of each element in a particular geometry fixture, and/or the desired number of elements in a particular geometry fixture and/or the desired position of elements forming the particular geometry fixture relative to one another and/or the desired angular orientation of the rotatable frames or rings 18a, 18b relative to the pallet 20, the controller can stop the motor 114 from lowering the movable section of the conveyor 22. The controller 220 can also emit a signal corresponding to an error message to a central controller or operator.

The process steps followed by the controller 220 when a pallet 20 is moved to a receiving workstation are shown in the simplified flow diagram of FIG. 17. The process is applied to both rotatable frames or rings 18a, 18b. The process starts at step 226. Step 228 monitors the configuration of each element 28a–28f forming a geometry fixture removably associated with the rotatable frames or rings 18a, 18b. If any of the elements 28a–28f defining the geometry fixture is not a desired element, the process continues to step 230 and an error message is emitted to a central controller or operator. The process ends at step 232. If the configuration of each element 28a–28f defining the geometry fixture is the desired element, the process continues to step 234. Step 234 monitors the position of each element 28a–28f forming the geometry fixture relative to one another. If the elements 28a–28f defining the geometry fixture are not positioned as desired, the process continues to step 230 where an error message is emitted to a central controller or operator. If the elements 28a–28f defining the geometry fixture are positioned along the rotatable frame or ring 18a, 18b as desired, the process continues to step 236. Step 236 monitors the angular orientation of the rotatable frames or rings 18a, 18b relative to the pallet 20. If the frame or ring 18a, 18b is not oriented as desired, the process continues to step 230 where an error message is emitted to a central controller or operator. If the frame or ring 18a, 18b is oriented angularly relative to the pallet 20 as desired, the process continues to step 238 and the movable section of the conveyor 22 is lowered relative to the base 17. After the conveyor section has been lowered, the assembly process continues at the workstation while the controller 220 process ends at step 232.

Alternatively, the sensors 224 can emit a signal corresponding to an image of the pallet 20 with associated rotatable frames or rings 18a, 18b and elements 28a–28f defining geometry fixtures. The controller 220 can compare the signal with data corresponding to an acceptable image stored in memory. If the signal does not correspond to the acceptable data image stored in memory, the controller 220 can emit a signal corresponding to an error message to a central controller or operator, and signal motor 114 to prevent lowering movement of the movable section of the conveyor 22 with respect to the base 17.

When the movable section of the conveyor 22 is lowered at one of the workstations 14b–14f, the conveyor locating means 196 can engage the movable section of the conveyor 22. When the pallet 20 has been stopped at the receiving workstation 14b–14f, the movable section of the conveyor is activated to move from the raised position to the lowered position. The plate 204 connected to the transverse member 66g of the movable section of the conveyor 22 prevents downstream movement of the movable section of the conveyor 22 with respect to the flow of workpieces along the path of travel 12. The plate 204 and roller 248 prevent transverse movement and longitudinal movement of the movable section of the conveyor 22 in response to vertical rotary movement of the rollers 104a, 104b being converted into vertical linear movement of the movable section of the conveyor 22 and supported pallet 20.

As the movable section of the conveyor 22 is lowered, the positioning means 16 can engage the pallet 20. The pin 156 can operably engages within the aperture 162 to accurately position the pallet 20 in a horizontal plane defined by horizontal axes extending longitudinally and transversely with respect to the path of travel 12. The guides 178a, 178d, and 178e can engage the horizontal frame member 36b to further locate and align the pallet 20 in a direction transverse to the path 12. The guides 178b, 178c, and 178f can engage the horizontal frame member 36a to limit transverse movement of the pallet with respect to the path of travel 12. Roller guiding means 164 can receive the guide member 172 connected to the pallet 20.

The movable section of the conveyor 22 can be lowered relative to the base 17 at the receiving workstation 14b–14f in response to control signals generated by the controller 220. The controller 220 can control the motor 114 to rotate the shaft 118 and pulleys 120a, 120b. The pulleys 120a, 120b drive the belts 112, 122 to rotate pulleys 110a associated with the shafts 106, 106a. Rollers or cams mounted on crank arms at each end of shafts 106, 106a are rotated about the axis of rotation of the corresponding shaft. Rollers or cams 126a, 126b as shown in FIG. 10 are received within the elongate slot or apertures defined by brackets 92a–92d. The rollers engage the corresponding brackets to raise and lower the movable section of the conveyor 22. Preferably, the movable section of the conveyor 22 can be vertically moved approximately 75 millimeters relative to the base 17.

When the movable section of the conveyor 22 is being lowered relative to base 17, an end 144 of the pin 50 can engage with the lock release actuator or key 142 causing the lock 48 to be moved from a locked position to an unlocked position. As the movable section of the conveyor 22 is being lowered, the gear teeth 32 of the rotatable frames or rings 18a, 18b engage gear teeth 140 of each gear 136 of the ring drivers 128a, 128b. The pin 50 and lock release actuator or key 142 are configured so that the lock 48 reaches the unlocked position only after the gear teeth 32 are in intermeshing engagement with the gear teeth 140 of the ring drivers 128a, 128b. When the movable section of the conveyor 22 is raised relative to the base 17, the lock 48 is moved to the locked position before the intermeshing gear teeth 32, 140 have completely disengaged.

At the loading workstation 14b, after the movable section of the conveyor 22 has been lowered relative to the base 17, the individual components and/or sub-assemblies received from the one or more workstations 24a–24d can be loaded into the geometry fixture associated with the rotatable frame or rings 18a, 18b. It should be recognized that the lock 48 can be manipulated independently from positioning the pallet 20 and locating the movable section of the conveyor 22. The lock release actuator 142 and corresponding ring drives 128a, 128b are only required to be present at workstations that require, or are performing, a reorientation of the angular position of the rotatable frames or rings 18a, 18b with respect to the supporting pallet 20. If desired in a particular application, after the lock 42 has been moved to the unlocked position, and the teeth 32 and 140 have meshed, components and/or sub-assemblies can be loaded into the geometry fixtures carried by the rings 18a, 18b. If desired for a particular application, the rings 18a, 18b can be rotated to assist in the process of loading the components and/or sub-assemblies into the various elements 28a–28f of the geometry fixtures. After the sub-assemblies and/or components have been mounted in the individual elements 28a–28f defining the geometry fixture, the clamping or gripping elements can be operated by any suitable actuator system. The clamping and gripping elements defining the geometry fixtures associated with the rings 18a, 18b are maintained in a clamped or gripped position while the pallet 20 moves along the first portion 208 of the path of travel 12.

After the sub-assemblies and/or components have been loaded within the geometry fixtures supported by the rotatable frames or rings 18a, 18b, and if required for a particular application, the rotatable frames or rings can be rotated independently of one another to a desired angular orientation relative to the pallet 20 by the motors 132 of the ring drivers 128a, 128b for further processing at the present workstations or at subsequent workstations. The controller 220 can independently control the motors 132 allowing for different angular movements by each rotatable frame or ring if desired. Position encoders can be associated with each motor 132 for signaling the angular position or orientation of each rotatable frame or ring. The controller 220 controls motor 114 to rotate the shaft 118 resulting in vertical movement of the movable section of the conveyor 22 relative to the base 17. The movable section of the conveyor 22 is raised in response to rotation of the shaft 118 by controller 220 when the frames or rings 18a, 18b have been loaded and/or rotated to a desired orientation relative to the pallet 20, and the pallet 20 is ready for delivery to the next workstation.

After the conveyor section 20 has been raised relative to the base 17 at any one of the workstations 14b–14f, the pallet is ready to be moved toward the next workstation. Sensors 224 can emit a signal corresponding to the presence of the sub-assemblies and/or components in the elements 28a–28f forming the geometry fixtures, as well as the angular orientation of the rotatable frames or rings 18a, 18b relative to the pallet 20. The controller 220 can receive the signals from the sensors 224 and emit an error signal to a central control system or operator if the required sub-assemblies and/or components are not loaded with respect to the elements 28a–28f of the geometry fixtures, or if the rotatable frames or rings 18a, 18b are not in a desired angular orientation relative to the pallet 20. If the sub-assemblies and/or components are loaded as desired, and the rotatable frames or rings 18a, 18b are in a desired angular orientation, the controller 220 controls motor 84 to rotate the wheels 70a–70f and move the pallet 20 to a subsequent workstation.

The first workstation 14c is positioned adjacent to and downstream of the loading workstation 14b along the path of travel 12. The workstation 14c can also include sensors 224 operable to emit a signal corresponding to the angular orientation of the rotatable frame or ring relative to the pallet 20 and the presence of sub-assemblies and/or components loaded with respect to the elements 28a–28f defining the particular geometry fixture. If the angular orientation of the rotatable frames or rings 18a, 18b is incorrect, the controller 220 can emit an error message to a central controller or operator.

Figure 19:
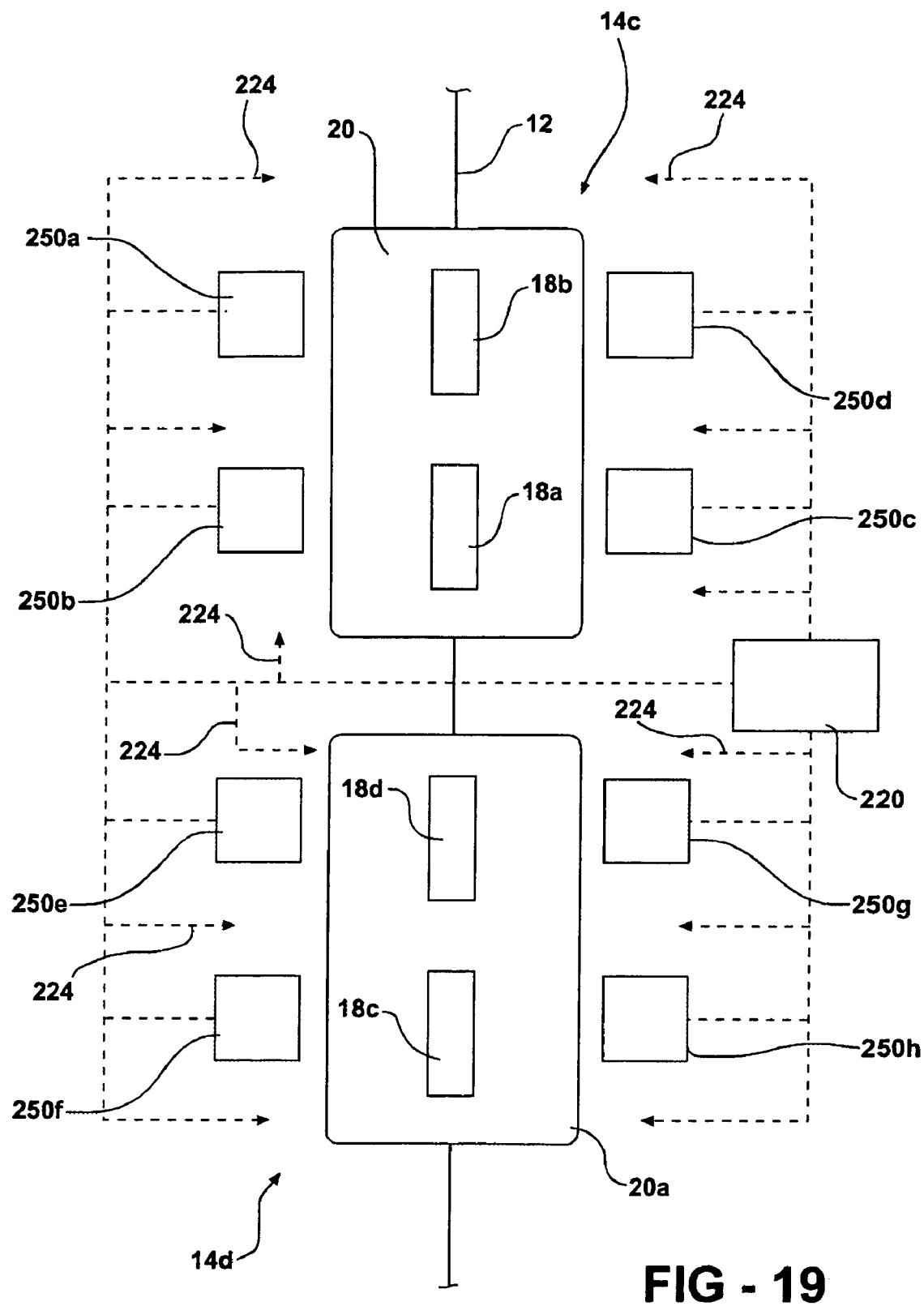
FIG. 19 is a schematic plan view of two workstations positioned adjacent to one another along the path of travel.

If the orientation of the rings 18a, 18b is in a desired orientation, the movable section of the conveyor 22 at the workstation 14c can be lowered by controller 220 actuating rotation of shaft 118 through motor 114. Referring now to FIGS. 18 and 19, the workstations 14c and 14d are first and second welding workstations, respectively for fixing the overall geometry of the workpiece held within the geometry fixtures associated with the rotatable frames or rings 18a, 18b. FIG. 19 schematically shows a first pallet 20 with rotatable frames or rings 18a, 18b at the first welding workstation 14c and a second pallet 20a with rotatable frames or rings 18c, 18d at the second welding workstation 14d. Sub-assemblies and/or components loaded with respect to the elements 28a–28f forming the geometry fixture can be welded at the first welding workstation 14c and the second welding workstation 14d. Each workstation can include one or more robots, such as robots 250a–250d positioned at workstation 14c, and robots 250e–250h positioned at workstations 14d. Robots 250a–250h can be welding robots. Each workstation can include four robots, two robots located on each side of the path of travel 12. The robots 250a and 250b, on a first side of the path of travel 12, can perform the identical weld passes with respect to the workpieces 11a, 11b held by the corresponding first and second rotatable frames or rings 18a, 18b located adjacent the respective robots when the pallet 20 is positioned at the workstation and the movable section of the conveyor is in the lowered position at the workstation. The robots 250c and 250d, on a second side of the path of travel 12, can perform identical weld passes on the two workpieces 11a, 11b carried by the pallet 20. Controller 220 can either control or interact with separate controllers for the robots 250a–250h to perform welding operations with respect to the individual workpieces 11a, 11b to be assembled. Robots 250e–250h can perform either identical weld passes as the robots 250a–250d, or can perform respot welding in areas inaccessible during the first welding passes. This may require a reorientation of the angular position of the rotatable frames or rings 18a, 18b at one of the workstations or at another workstation interposed between the illustrated workstations 14c, 14d. If any of the robots 250a–250d fails to perform a desired welding operation due to mechanical failure or scheduled maintenance, the controller 220 can detect such an error through appropriate signals received from each of the robots 250a–250d. The controller 220 can compensate for the detected error by instructing one or more of the robots downstream of the failed robot, such as robots 250d–250h at the workstation 14d, to perform the required weld passes that were not performed by the failed robot. If the lock release actuator 142 and ring drives 128a, 128b have been provided at each of the workstations, the rotatable frames or rings 18a, 18b can be rotated at any of the workstations between processing operations so that all welding is performed on an upwardly facing surface to allow easier access while improving quality and repeatability of the weld processing operations. These features provide greater flexibility, redundancy, and higher quality finished workpieces in the production line than previously provided in assembly lines for motorcycle frames.

Figure 20:
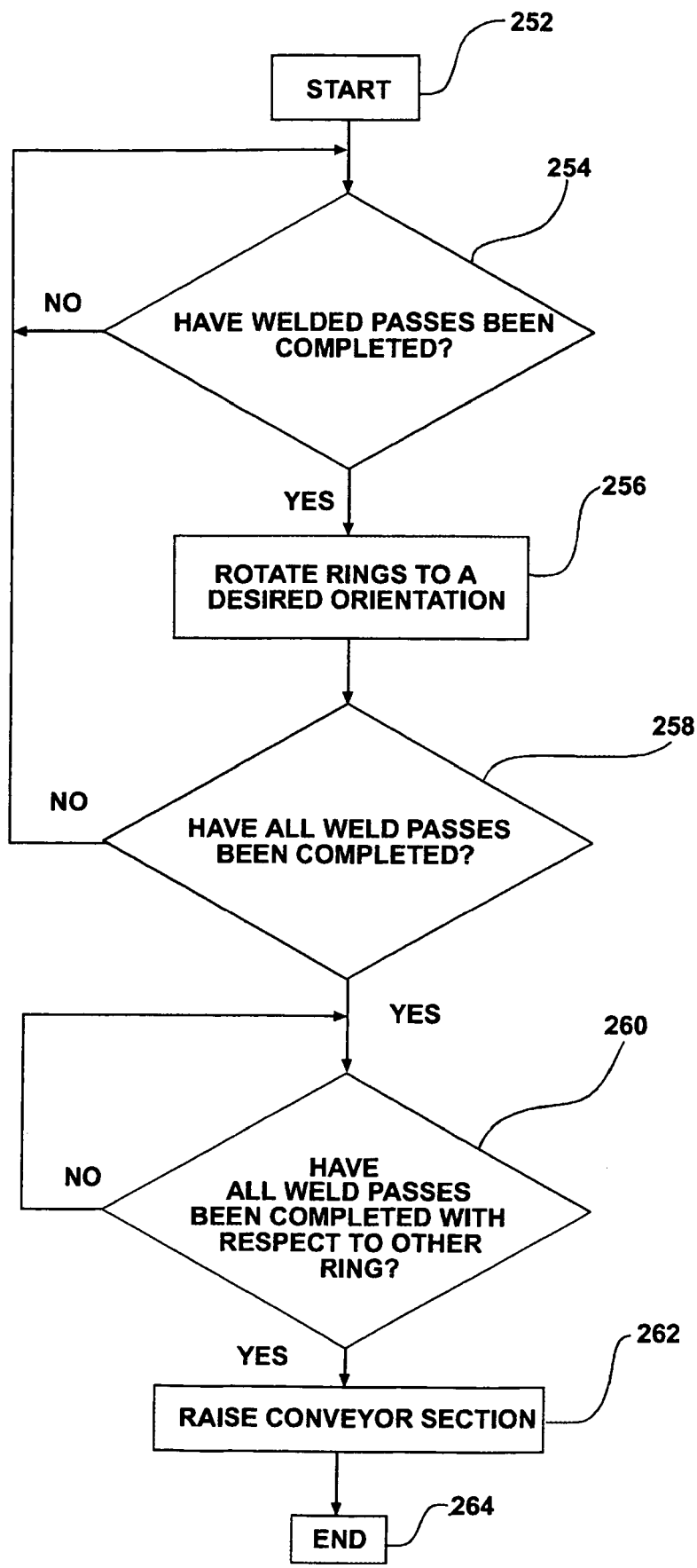
FIG. 20 is a simplified flow diagram illustrating steps performed when the workpieces are processed at a workstation according to the present invention.

The controller 220 according to the present invention processes according to a control program stored in memory. The process begins after the workpieces supported by the pallet 20 are delivered to the movable section of the conveyor 22 and have been moved to the lowered position. T process is illustrated in the simplified flow diagram of FIG. 20. The process starts at step 252. Step 254 determines whether the required weld passes have been completed by the pair of robots located on each side of rotatable frames or rings 18a, 18b. By way of example and not limitation, robot 250a can make a particular weld pass with respect to the workpiece 11b mounted with respect to the ring 18b, and emit a signal to the controller 220 corresponding to completion of the particular weld pass. Robot 250d can perform a first weld pass with respect to the workpiece 11b and emit a signal to the controller 220 corresponding to completion of the first weld pass. After the controller 220 has received signals corresponding to completion of all the required weld passes from the robots 250a and 250d, step 256 determines if a reorientation of the angular position of the rotatable frame 18a, 18b is required, and if required, controller 220 actuates the appropriate motor to rotate the rotatable frame or ring 18a, 18b to a desired predetermined orientation relative to the pallet 20. By way of example and not limitation, the controller 220 can control the motor 132a to rotate the rotatable frame or ring 18b and position the workpiece 11b in a desired angular position with respect to the robots 250a and 250d. The rotatable frame or ring 18a, 18b can be rotated so that subsequent weld passes can be completed in a downward orientation (i.e. on an upwardly facing surface) with respect to the motorcycle frame as the welding process is completed. Step 258 determines if all of the required weld passes for the rotatable frame or ring have been completed. By way of example and not limitation, the controller 220 can store in memory data corresponding to the required weld passes to be performed by each robot 250a–250h and compare the signals received from each robot with the stored data as the required weld passes are completed by each robot. If all of the required weld passes have not been completed, the process returns to step 254. If the all of the required weld passes with respect to a particular workpiece carried by a particular rotatable frame or ring have been completed, step 260 determines whether all of the weld passes have been completed with respect to the other workpiece carried by the other rotatable frame or ring associated with the common pallet. The controller 220 can simultaneously monitor the completion of required weld passes with respect to the rotatable frames or rings 18a, 18b. When the required weld passes for the rotatable frames or rings 18a, 18b have been completed, step 262 raises the movable section of the conveyor 22 supporting the pallet 20. The motor 114 is controlled by controller 220 to rotate shaft 118 and vertically move the movable section of the conveyor 22 to the raised position. The process ends at step 264.

After all the processing or welding operations at workstations 14c, 14d have been completed, the pallet 20 can be moved to workstations 14e, 14f, respectively, for further processing. Before the pallet 20 is moved from any of the workstations, corresponding sensors 224 positioned at each of the workstations emit signals to the controller 220 corresponding to the angular orientation of the rotatable frame or rings 18a, 18b with respect to the pallet 20. The controller 220 emits an error message to a central controller or operator, if any one of the rotatable frames or rings 18a, 18b is not in a desired angular orientation relative to the pallet 20. If an error signal is generated by the controller 220, continued movement of the pallets 20 along the path of travel 12 is stopped. By way of example and not limitation, processing operations at workstations 14e, 14f can include, but are not limited to, removal of the assembled workpieces 11a, 11b from the rotatable frames or rings 18a, 18b, inspection of the workpieces 11a, 11b, and/or finishing of the workpieces 11a, 11b. Workstations 14e, 14f can include sensors 224 in communication with the controller 220 and/or additional robots for automated processing.

It should be recognized that only those workstations requiring accurate positioning and locating of the workpiece for automated processing will need all of the structure described with respect to base 17 for supporting a movable section of the conveyor 22 and/or accurately locating the movable section of conveyor 22 and/or accurately positioning the pallet 20 at the corresponding workstation. Manual loading/unloading workstations, or manual inspection workstations, or manual respot workstations can be provided with a simplified base for supporting the conveyor 22.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method for assembling a plurality of different frames on a single assembly line comprising the steps of:
locating a pallet in at least one workstation along a path of travel defining an assembly line;
rotatably supporting at least one fixture on the pallet for movement along the path of travel of the assembly line, the at least one fixture having a non-vertical axis of rotation;
receiving components of a frame to be assembled in fixed relationship to one another in the at least one fixture supported on the pallet for movement along the path of travel of the assembly line;
orienting the components supported in the at least one fixture in different angular orientations about the non-vertical axis of rotation for processing along the path of travel of the assembly line;
locking each of the at least one rotatable fixture supported on the pallet in a desired angular orientation with respect to the pallet during at least some portions of processing along the path of travel of the assembly line and
moving the pallet with the at least one fixture supported thereon and the components supported on the at least one fixture along the path of travel of the assembly line.

2. The method of claim 1 wherein the locking step further comprises the steps of:
connecting at least one latch to the pallet for movement between a locked position and an unlocked position with respect to each of the at least one rotatable fixture; and
biasing each of the at least one latch toward the locked position.

3. The method of claim 2 wherein the biasing step further comprises the steps of:
moving a reciprocal lock member between an engaged position and a disengaged position, such that the lock member is engaged with the latch for holding the latch in the locked position when in the engaged position, and such that the lock member moves the latch to the unlocked position when in the disengaged position; and
biasing the lock member toward the engaged position with a spring.

4. The method of claim 3 wherein the moving step further comprises the step of:
engaging an actuator with the lock member for moving the lock member from the engaged position against the urging of the biasing spring toward the disengaged position.

5. The method of claim 1 further comprising the step of:
adjusting an angular orientation of the corresponding fixture about an axis of rotation with respect to the pallet with at least one drive engageable with each of the at least one rotatable fixture.

6. The method of claim 1 further comprising the step of:
moving the pallet along a conveyor defining a path of travel through the at least one workstation.

7. The method of claim 6 further comprising the step of:
moving a movable section of the conveyor located at the workstation between a first position and a second position.

8. The method of claim 7 further comprising the step of:
locating the pallet with respect to the movable section of the conveyor.

9. The method of claim 1 further comprising the step of:
controlling movement of the pallet and each of the at least one rotatable fixture in response to a signal corresponding to an identification of a frame to be assembled at the workstation.

10. The method of claim 1 further comprising the step of:
locating the pallet with respect to the workstation.

11. The method of claim 1, wherein the at least one fixture further comprises:
providing the at least one fixture as a plurality of fixtures separable into at least a first group of fixtures and a second group of fixtures, the first group of fixtures for supporting components defining a different frame structure from the second group of fixtures; and
selecting the at least one fixture for association with the pallet from one of the first group and the second group of fixtures independent of the pallet supporting the fixtures in order to meet a production mix of components for different frame structures in any sequence and combination of the first group and the second group of fixtures.

12. A method for assembling a plurality of different frames on a single assembly line comprising the steps of:
locating a pallet in at least one workstation;
rotatably supporting at least one fixture on the pallet, the at least one fixture having a non-vertical axis of rotation and for receiving components of a frame to be assembled in fixed relationship to one another;
locking each of the at least one rotatable fixture supported on the pallet in a desired angular orientation with respect to the pallet;
moving the pallet along a conveyor defining a path of travel through the at least one workstation;
moving a movable section of the conveyor located at the workstation between a first position and a second position, wherein the moving step further includes rotating of a crank arm having a cam follower connected adjacent to an outer radial end of the crank arm with respect to an axis of rotation, the cam follower engageable within an elongate slot associated with the movable section of the conveyor.

13. A method for assembling a plurality of different frames on a single assembly line comprising the steps of:
locating a movable pallet in at least one workstation located along a path of travel defining an assembly line;
rotatably supporting at least one fixture on the pallet for movement along the path of travel of the assembly line, the at least one fixture having a non-vertical axis of rotation;
receiving components of a frame to be assembled in fixed relationship to one another in the at least one fixture supported on the pallet for movement along the path of travel of the assembly line;
orienting the components supported in the at least one fixture in different angular orientations about the non-vertical axis of rotation for processing along the path of travel of the assembly line;
locking each of the at least one rotatable fixture supported on the pallet in a desired angular orientation with respect to the pallet during at least some portions of processing along the path of travel of the assembly line;

welding the components of the frame to one another along the path of travel of the assembly line and moving the pallet with the at least one fixture supported thereon and the components supported on the at least one fixture along the path of travel of the assembly line.

14. The method of claim 13 further comprising the steps of:

rotating the at least one fixture about a generally horizontal axis of rotation.

15. The method of claim 13 further comprising the steps of:

rotating the at least one fixture including a first fixture and a second fixture about generally parallel horizontal axes of rotation;

simultaneously engaging and locking the first and second fixtures against further rotation when in a locked position with the locking means including a single lock; and adjusting an angular orientation of the fixtures about the axes of rotation with respect to the pallet with at least one drive engageable with the first and second fixtures.

16. The method of claim 13 further comprising the steps of:

the plurality of different frames defining different models of motorcycle frame to be assembled in any sequential order along the single assembly line; and control means, responsive to a signal corresponding to an identification of a motorcycle frame to be assembled at the workstation, for controlling angular movement of the at least one rotatable fixture about the non-vertical axis of rotation.

17. The method of claim 13 further comprising the steps of:

controlling angular movement of the at least one rotatable fixture about the non-vertical axis of rotation with control means responsive to a signal corresponding to an identification of the at least one rotatable frame supported on the pallet to be delivered to the workstation.

18. The method of claim 13 further comprising the step of:

providing the at least one fixture as including first and second fixtures, each fixture located generally parallel to one another having a generally horizontal axis of rotation.

19. The method of claim 18 further comprising the steps of:

locking each of the at least one rotatable fixture supported on the pallet in a desired angular orientation with respect to the pallet with a single lock for simultaneously engaging and locking the first and second fixtures against further rotation when in a locked position; and adjusting an angular orientation of the fixtures about the axes of rotation with respect to the pallet with at least one drive engageable with the first and second fixtures.

20. The method of claim 13 further comprising the steps of:

assembling the different frames defining different models of motorcycle frames to be assembled in any sequential order along the single assembly line; and control means, responsive to a signal corresponding to an identification of a motorcycle frame to be assembled at the workstation, for controlling angular movement of the at least one rotatable fixture about the non-vertical axis of rotation.

* * * * *

UNITED STATES PATENT AND TRADEMARK OFFICE
CERTIFICATE OF CORRECTION

| | | |
|---|---|---|
| PATENT NO. | : 7,165,309 B2 | Page 1 of 1 |
| APPLICATION NO. | : 11/037745 | |
| DATED | : January 23, 2007 | |
| INVENTOR(S) | : Velibor Kilibarda, Michael R. Dugas and Peter C. Kekic | |

It is certified that error appears in the above-identified patent and that said Letters Patent is hereby corrected as shown below:

On the Title sheet, item (75), the first named inventor should read:

Velibor Kilibarda, Birmingham, MI (US)

Signed and Sealed this

Seventeenth Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 7,165,309 B2  Page 1 of 1
APPLICATION NO. : 11/037745
DATED : January 23, 2007
INVENTOR(S) : Kilabarda et al.

It is certified that error appears in the above-identified patent and that said Letters Patent is hereby corrected as shown below:

Column 6, Line 36: Replace "70a . 70f" with --70a-70f--.
Column 11, Line 42: Replace "frame" with --frame,--.
Column 17, Line 31: Replace "line" with --line;--.
Column 19, Line 4: Replace "line" with --line;--.

Signed and Sealed this

Fourteenth Day of August, 2007

JON W. DUDAS
*Director of the United States Patent and Trademark Office*